United States Patent
Suzuki et al.

(10) Patent No.: US 12,434,816 B2
(45) Date of Patent: Oct. 7, 2025

(54) FLYING OBJECT WITH BACKWARD-TILTING DELIVERY PAYLOAD MECHANISM

(71) Applicant: AERONEXT INC., Tokyo (JP)

(72) Inventors: Yoichi Suzuki, Tokyo (JP); Narumi Watanabe, Tokyo (JP); Takuya Hori, Tokyo (JP)

(73) Assignee: AERONEXT INC., Tokyo (JP)

( * ) Notice: Subject to any disclaimer, the term of this patent is extended or adjusted under 35 U.S.C. 154(b) by 0 days.

(21) Appl. No.: 18/683,725

(22) PCT Filed: May 25, 2022

(86) PCT No.: PCT/JP2022/021395
§ 371 (c)(1),
(2) Date: Feb. 14, 2024

(87) PCT Pub. No.: WO2023/026616
PCT Pub. Date: Mar. 2, 2023

(65) Prior Publication Data
US 2024/0351684 A1    Oct. 24, 2024

Related U.S. Application Data

(63) Continuation of application No. PCT/JP2021/030862, filed on Aug. 23, 2021.

(51) Int. Cl.
*B64C 17/02* (2006.01)
*B64D 9/00* (2006.01)
(Continued)

(52) U.S. Cl.
CPC ............. *B64C 17/02* (2013.01); *B64D 9/00* (2013.01); *B64U 10/14* (2023.01); *B64U 2101/60* (2023.01)

(58) Field of Classification Search
CPC ...... B64C 17/02; B64C 17/04; B64U 2101/60
See application file for complete search history.

(56) References Cited

U.S. PATENT DOCUMENTS

2016/0236772 A1    8/2016  Tang
2019/0039721 A1*   2/2019  Liu ......................... B63B 39/02
(Continued)

FOREIGN PATENT DOCUMENTS

CN    206155784 U    5/2017
JP    200139397 A    2/2001
(Continued)

OTHER PUBLICATIONS

International Search Report dated Jul. 12, 2022 for International Application No. PCT/JP2022/021395.
(Continued)

*Primary Examiner* — Arfan Y. Sinaki
(74) *Attorney, Agent, or Firm* — HAUPTMAN HAM, LLP

(57) ABSTRACT

The invention is a flying object equipped with a loading part holding a delivery payload, and the loading part or the delivery payload is attached to an airframe so that the loading part or the delivery payload is tilted backward in the forward and backward direction in a landing state or hovering state. The loading part or delivery payload is attached to the airframe so that the loading part or delivery payload is substantially horizontal during cruising.

13 Claims, 29 Drawing Sheets

(51) Int. Cl.
    *B64U 10/14*     (2023.01)
    *B64U 101/60*    (2023.01)

(56) References Cited

U.S. PATENT DOCUMENTS

2020/0377207 A1* 12/2020 Suzuki .................... B64D 9/00
2021/0403146 A1* 12/2021 Atsumi ................ B64C 25/001

FOREIGN PATENT DOCUMENTS

| JP | 2001039397 A | * | 2/2001 |
| JP | 5997342 B1 | | 9/2016 |
| JP | 2016537234 A | | 12/2016 |
| JP | 6086519 B1 | | 3/2017 |
| JP | 2019073160 A | | 5/2019 |
| JP | 6618000 B1 | | 12/2019 |
| JP | 2021020529 A | | 2/2021 |
| WO | 2019073521 A1 | | 4/2019 |
| WO | 2020045397 A1 | | 3/2020 |

OTHER PUBLICATIONS

International Search Report mailed Oct. 12, 2021 for International Application No. PCT/JP2021/030862.

* cited by examiner

FLYING OBJECT WITH BACKWARD-TILTING DELIVERY PAYLOAD MECHANISM

TECHNICAL FIELD

This invention relates to flying objects.

BACKGROUND ART

In recent years, the practical application of home delivery services using flying objects such as drones and unmanned aerial vehicles (UAVs; hereinafter collectively referred to as "flying objects") has been promoted. Flying objects equipped with multiple propellers (hereinafter collectively referred to as "multicopters"), commonly called multicopters, do not require a takeoff/landing runway as do ordinary fixed-wing aircraft, allowing them to operate in relatively small areas and making them suitable for providing home delivery and other transportation services.

However, multicopters may have a shorter range than engine aircraft that utilize liquid fuel. Unlike cases in which flights are carried out for a limited time and range, such as filming, long-duration, long-distance flights are required in transportation applications. In view of this situation, Patent Literature 1 discloses a flying object that enables long-distance transportation by flying along electric wires and using electric power flowing through the wire path (see, for example, Patent Literature 1).

PRIOR ART LIST

Patent Literature

[Patent Literature 1] JP2021-020529A

SUMMARY OF THE INVENTION

Technical Problem

Patent Literature 1 discloses a flying object that can improve its range by utilizing power flowing in a wire path.

However, in transportation operations, flight routes may be flown over ocean or mountainous areas where it is difficult to receive an external power supply. Even in such cases, it is necessary to improve the fuel efficiency of flying objects in order to achieve an increase in cruising range.

Furthermore, in recent years, there are cases where it is desirable to increase the size and weight of the goods carried in a single flight. As the size and weight of goods increase, drag and motor addition during the movement of flying objects increase, which may be a factor that leads to a decrease in fuel consumption.

In view of this situation, one object of the flying object according to the invention is to provide a flying object that can improve fuel efficiency in the forward attitude that is primarily used by flying objects for transportation.

Technical Solution

The invention provides a flying object equipped with a loading part holding a delivery, wherein the loading part or the delivery is attached to the flying object such that the loading part or the delivery is tilted backward in the forward and backward direction in the landing or hovering state.

Other issues disclosed in this application and their solutions will be clarified in the "Embodiments of the Invention" section and in the drawings.

Advantageous Effects

According to the invention, a flying object capable of transporting goods can be provided, which can improve fuel efficiency.

Figure 1:
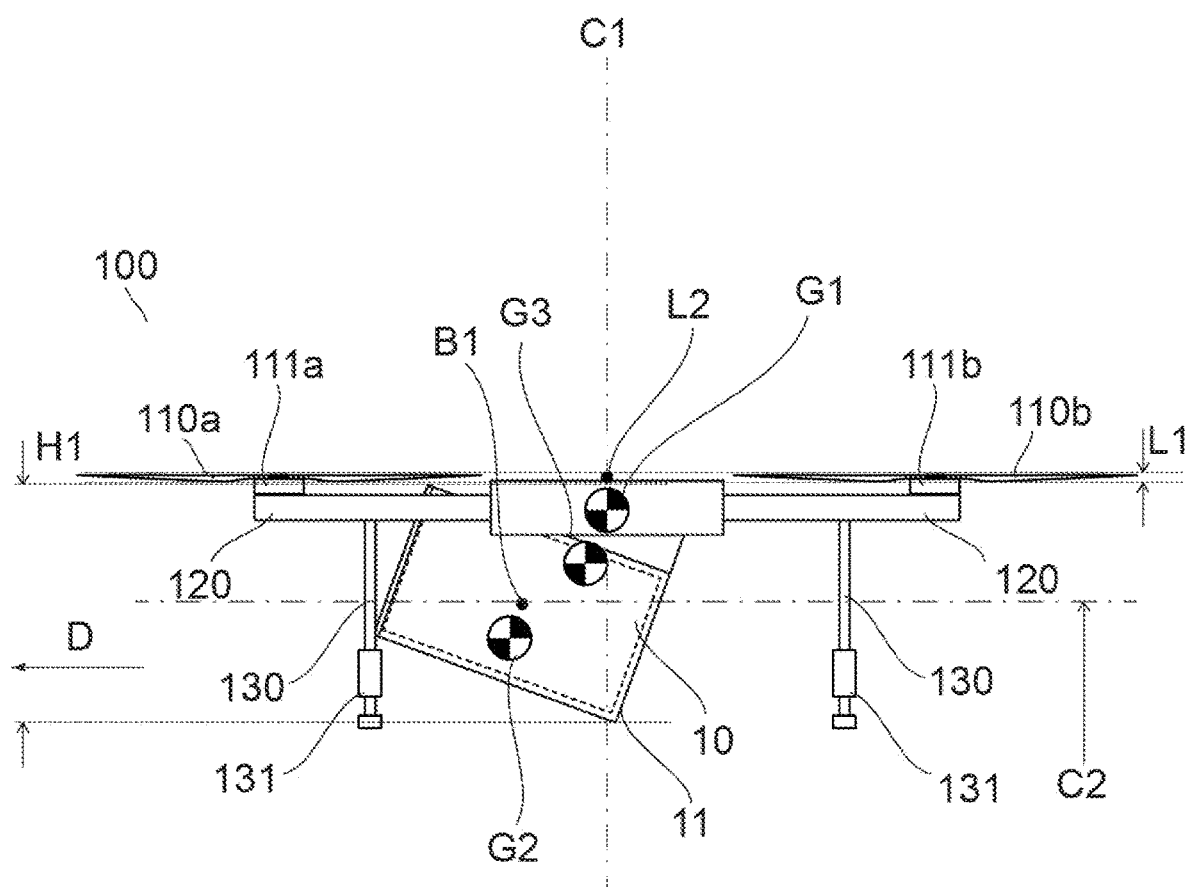
FIG. 1 is a schematic view of the flying object according to the invention, viewed from the side.
Figure 1:
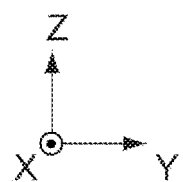

The contents of this embodiment of the invention are listed and described in detail. The flying object according to this embodiment of the invention has the following configuration.

Item 1

A flight object comprising a loading part holding a delivery payload,
wherein the loading part or the delivery payload is attached to an airframe such that the loading part or the delivery payload is tilted backward in the front-rear direction in the landing state or the hovering state.

Item 2

The flight object according to item 1,
wherein the loading part or the delivery payload is attached to the airframe such that the loading part or the delivery payload is substantially horizontal in the cruising state.

Item 3

The flight object as in item 1 or item 2,
wherein, in the landing or hovering state, the center position of the loading part is located in front of the center position of the airframe in the front-rear direction and below the center point of lift generation.

Item 4

The flight object as in item 1 or item 2,
wherein, in the landing or hovering state, the center position of the loading part is rearward of the center position of the airframe in the front-rear direction and below the center point of lift generation.

Item 5

The flight object as in item 1 or item 2,
wherein, in the landing or hovering state, the center position of the loading part is rearward of the center position of the airframe in the front-rear direction and above the center point of lift generation.

Item 6

The flight object as in item 1 or item 2,
wherein, in the landing or hovering state, the center position of the loading part is in front of the center position of the airframe in the front-rear direction and above the center point of lift generation.

Item 7

The flight object as in item 1 or item 2,
wherein, in the landing or hovering state, the center position of the loading part coincides or substantially coincides with the center position of the airframe in the front-rear direction, and is provided near the center point of lift generation or near the center of gravity of the airframe.

Item 8

The flight object as in item 1 or item 2,
wherein, in the landing or hovering state, the center position of the loading part coincides with or substantially coincides with the center position of the airframe in the front-rear direction and is provided above the center point of the lift generation.

Item 9

The flight object as in item 1 or item 2,
wherein, in the landing or hovering state, the center position of the loading part coincides with or substantially coincides with the center position of the airframe in the front-rear direction and below the center point of lift generation.

Item 10

The flying object according to item 1,
wherein the loading part is configured to store the delivery payload from the front and above the airframe.

Item 11

The flying object according to item 1,
wherein the loading part is configured to store the delivery payload from behind and below the airframe.

Item 12

The flying object according to item 1,
wherein the loading part is configured to store the delivery payload from the front of and below the airframe.

Item 13

The flying object according to item 1,
wherein the loading part is configured to store the delivery payload from behind and above the airframe.

Item 14

The flying object as in any of items 10 to 13,
wherein the loading part comprises a lid that can be opened and closed to store the delivery payload.

Item 15

The flight object as in item 1 or item 2,
wherein the flying object is provided with at least front and rear leg parts, and
wherein the front leg part is longer than the rear leg part.

DETAILS OF EMBODIMENTS ACCORDING TO THIS INVENTION

The flying object according to this embodiment of the invention is described below with reference to the drawings.

DETAILS OF THE FIRST EMBODIMENT

Figure 2:
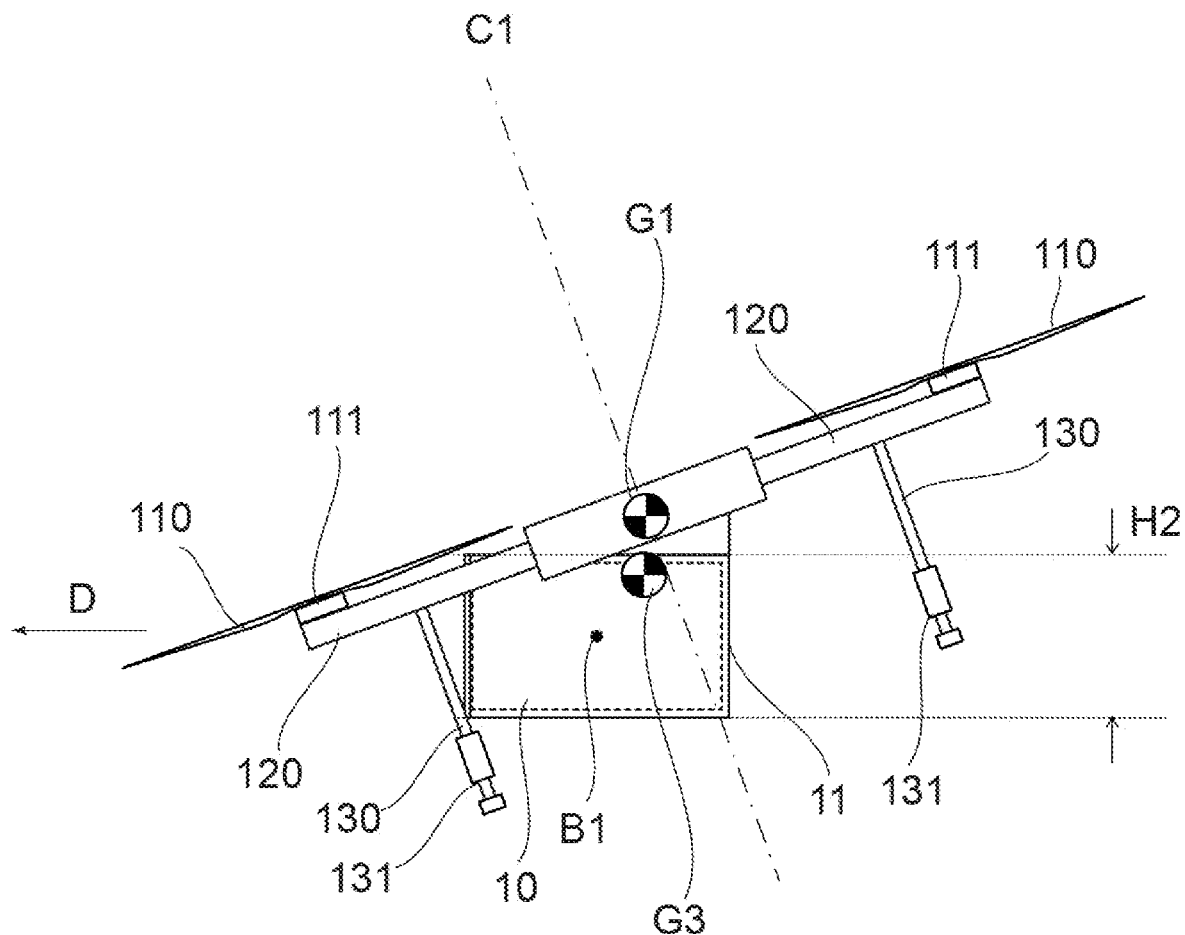
FIG. 2 is a view of the flying object of FIG. 1 in cruising attitude.

As illustrated in FIG. 1 and FIG. 2, a flying object 100 is a flying object that can take off, land, and fly with a load 10 on it.

The flying object 100 takes off from the takeoff point and flies to the destination. For example, when the flying object makes a delivery, the flying object reaches the destination, lands at or hovers over a port, etc., and completes the delivery by detaching the load. After detaching the load, the flying object moves to other destinations.

As shown in FIG. 1 and FIG. 2, the flying object 100 according to this embodiment of this invention is equipped with a flight part that includes a plurality of rotor blade parts comprising at least a propeller 110 and a motor 111 and elements such as a motor mount and frame 120 that support the rotor blade part in order to perform flight. And it should be equipped with energy (e.g., secondary batteries, fuel cells, fossil fuels, etc.) to operate them.

The flying object 100 shown in the figure is depicted in a simplified form to facilitate the explanation of the invention's structure, and detailed components such as the control part, for example, are not shown in the figure.

The flying object 100 is moving forward in the direction of arrow D (−Y direction) in FIG. (see below for details).

In the following explanation, the terms may be used according to the following definitions. Forward and backward: +Y and −Y, up and down (or vertical): +Z and −Z, left and right (or horizontal): +X and −X, forward direction (forward): −Y, rearward direction (backward) direction (backward): +Y direction, ascending direction (upward): +Z direction, descending direction (downward): −Z direction.

The propeller 110 rotates upon receiving output from the motor 111. The rotation of the propeller 110 generates propulsive force to take the flying object 100 off from the starting point, move to, and land at the destination. The propeller 110 can rotate to the right, stop, and rotate to the left.

The propeller 110 provided with the flying object of the invention has one or more blades. Any number of blades (rotors) (e.g., 1, 2, 3, 4, or more blades) is acceptable. The shape of the blades can be any shape, such as flat, curved, kinked, tapered, or a combination thereof. The shape of the blades can be changeable (e.g., stretched, folded, bent, etc.). The blades can be symmetrical (having identical upper and lower surfaces) or asymmetrical (having differently shaped upper and lower surfaces). The blades can be formed into airfoils, wings, or any geometry suitable for generating dynamic aerodynamic forces (e.g., lift, thrust) as the blades are moved through the air. The geometry of the blade/vane can be selected as appropriate to optimize the dynamic aerodynamic characteristics of the blade, such as increasing lift and thrust and reducing drag.

The propeller provided by the flying object of the invention may be, but is not limited to, fixed pitch, variable pitch, or a mixture of fixed and variable pitch.

The motor 111 produces rotation of the propeller 110: for example, a drive unit can include an electric motor or an engine. The blades can be driven by the motor and rotate around the axis of rotation of the motor (e.g., the long axis of the motor).

The blades can all rotate in the same direction or can rotate independently. Some of the blades rotate in one direction while others rotate in the other direction. The blades can all rotate at the same RPM, or they can each rotate at a different RPM. The number of rotations can be determined automatically or manually based on the dimensions of the moving object (e.g., size, weight) and the control conditions (speed, direction of movement, etc.).

The flying object 100 determines the number of revolutions of each motor and the angle of flight according to the wind speed and direction by means of the flight controller 1001, ESC 112, and transceiver (propo/radio) 1006. This allows the flying object to perform movements such as ascending and descending, accelerating and decelerating, and changing direction.

The flying object 100 can fly autonomously according to routes and rules set in advance or during the flight, or by using the transceiver (propo/radio) 1006 to control the flying object.

Figure 6:
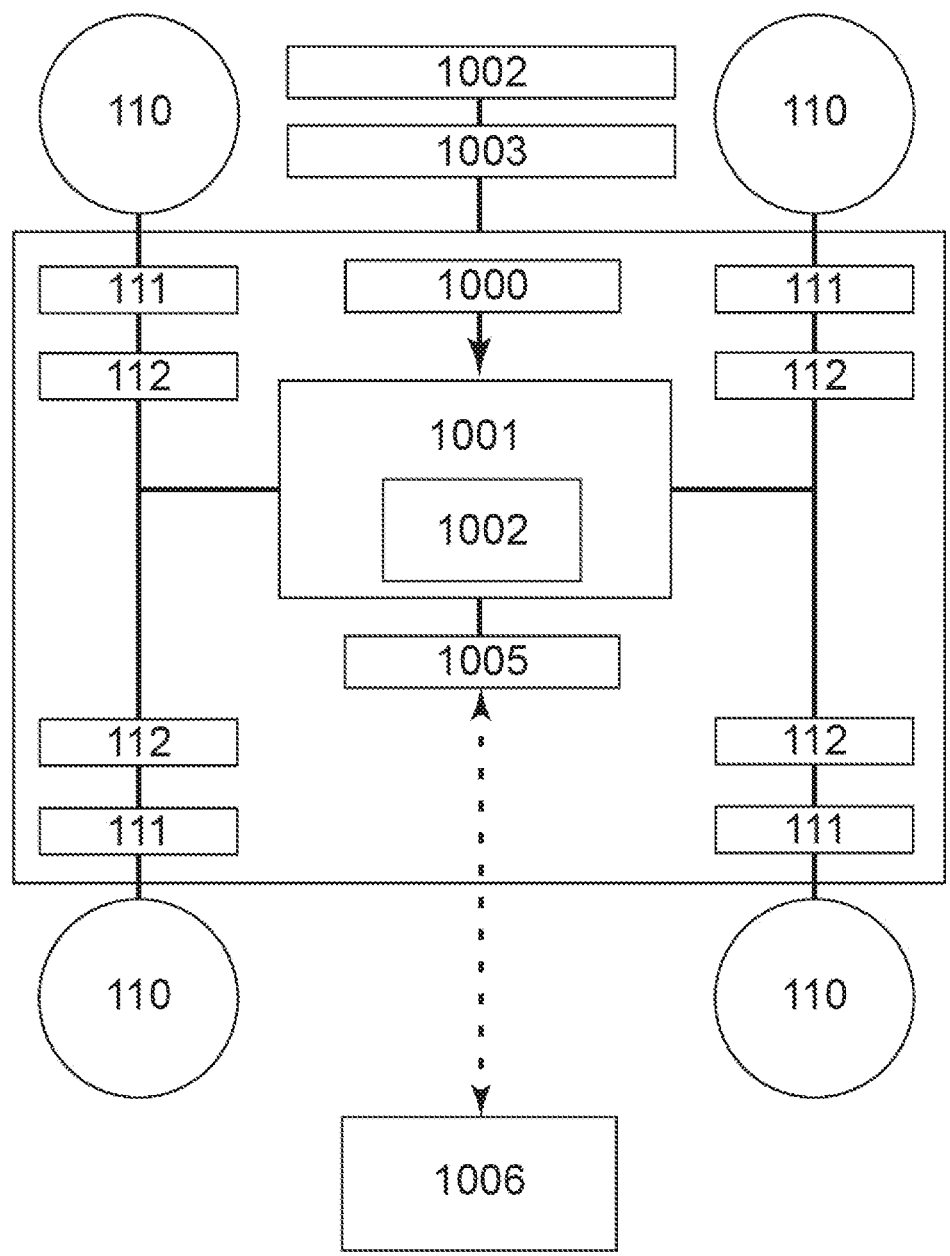
FIG. 6 is a functional block diagram of the flying object shown in FIG. 1.

The flying object 100 described above has a functional block shown in FIG. 6. The functional block in FIG. 6 is an example of a minimum reference configuration. The flight controller 1001 is a so-called processing unit. The processing unit can have one or more processors, such as a programmable processor (e.g., a central processing unit (CPU)). The processing unit has a memory, not shown, which is accessible. The memory stores logic, code, and/or program instructions that can be executed by the processing unit to perform one or more steps. The memory may include, for example, a separable medium such as an SD card or random access memory (RAM) or an external storage device. Data acquired from sensors 1002 may be directly transmitted to and stored in the memory. For example, still and video data captured by a camera or other device is recorded in the internal or external memory.

The processing unit includes a control module configured to control the condition of the rotor blades aircraft. For example, the control module controls the propulsion mechanism (e.g., motor) of the rotorcraft to adjust the spatial arrangement, velocity, and/or acceleration of the rotorcraft having six degrees of freedom (translational motion x, y and z, and rotational motion θx, θy and θz). The control module can control one or more of the states of the loading part, sensors, etc.

The processing unit is capable of communicating with a transmission/reception unit 1005 comprising one or more external devices (e.g., a terminal, display, or other remote controller) to transmit and/or receive data. The transmitter/receiver 1006 can use any suitable means of communication, such as wired or wireless communication. For example, the transmission/reception unit 1005 can use one or more of local area network (LAN), wide area network (WAN), infrared, wireless, WiFi, point-to-point (P2P) network, telecommunication network, cloud communication, etc. The transmission/reception unit 1005 can transmit and/or receive one or more of the following: data acquired by the sensors 1002, processed results generated by the processing unit, predetermined control data, and user commands from a terminal or remote controller.

Sensors 1002 in this embodiment can include inertial sensors (accelerometers, gyroscopes), GPS sensors, proximity sensors (e.g., lidar), or vision/image sensors (e.g., cameras).

The plane of rotation of the propeller 110 provided by the flying object 100 in this embodiment is at a forward inclined angle toward the direction of travel when traveling. The forward inclined plain of rotation of the propeller 110 generates upward lift and thrust in the direction of travel, which propels the flying object 100.

The flying object 100 may be equipped with a main body part that can contain a processing unit, battery, etc. to be loaded part in the flight part, which is equipped with a motor, propeller, frame, etc. to generate lift and thrust. The main body part can optimize the shape of the flying object 100 in its attitude during cruising, which is expected to be maintained for a long time during the movement of the flying object 100, and increase the flight speed, thereby efficiently reducing the flight time.

The main body part should have an outer skin that is strong enough to withstand flight, takeoff and landing. For example, plastic and FRP are suitable materials for the outer skin because of their rigidity and water resistance. These materials may be the same material as the frame 120 (including arms) included in the flight part, or they may be different materials.

The motor mount, frame 120, and main body part provided by the flight part may be comprised by connecting the parts together or by using a monocoque structure or integral molding (for example, the motor mount and frame 120 can be molded as one piece, or the motor mount, frame 120, and main body part can all be molded as one piece, etc.). By integrating the parts as one piece, the joints between each part can be made smooth, which is expected to reduce drag and improve fuel efficiency of flying objects such as blended wing bodies and lifting bodies.

The shape of the flying object 100 may be directional. For example, the flying object 100 may have a streamlined main body part that has less drag in a cruising attitude in no wind, or other shapes that improve flight efficiency when the nose of the flying object is facing directly into the wind.

The loading part 11 is the part that connects to the flight part. The loading part 11 can be configured, for example, to hold the payload 10, and more preferably to be configured to contain the payload 10. The payload 10 is described in this embodiment as an example of a package or a shipping box that serves as a packing material for the payload, but the technology is not limited to such examples. For example, the load 10 may include delivery payloads such as daily necessities, books, food, etc., to be delivered from a dealer to an ordered user (either directly or through a receiving location such as a retailer, distributor, temporary storage location, etc.), as well as devices such as cameras, sensors and actuators for inspecting structures, etc., and other objects that can be loaded onto the flight part. The objects comprising the loading parts 11 may be singular or plural. These loading parts 11 are fixed to the flight part and are inclined according to the inclination of the flying object.

Figure 3:
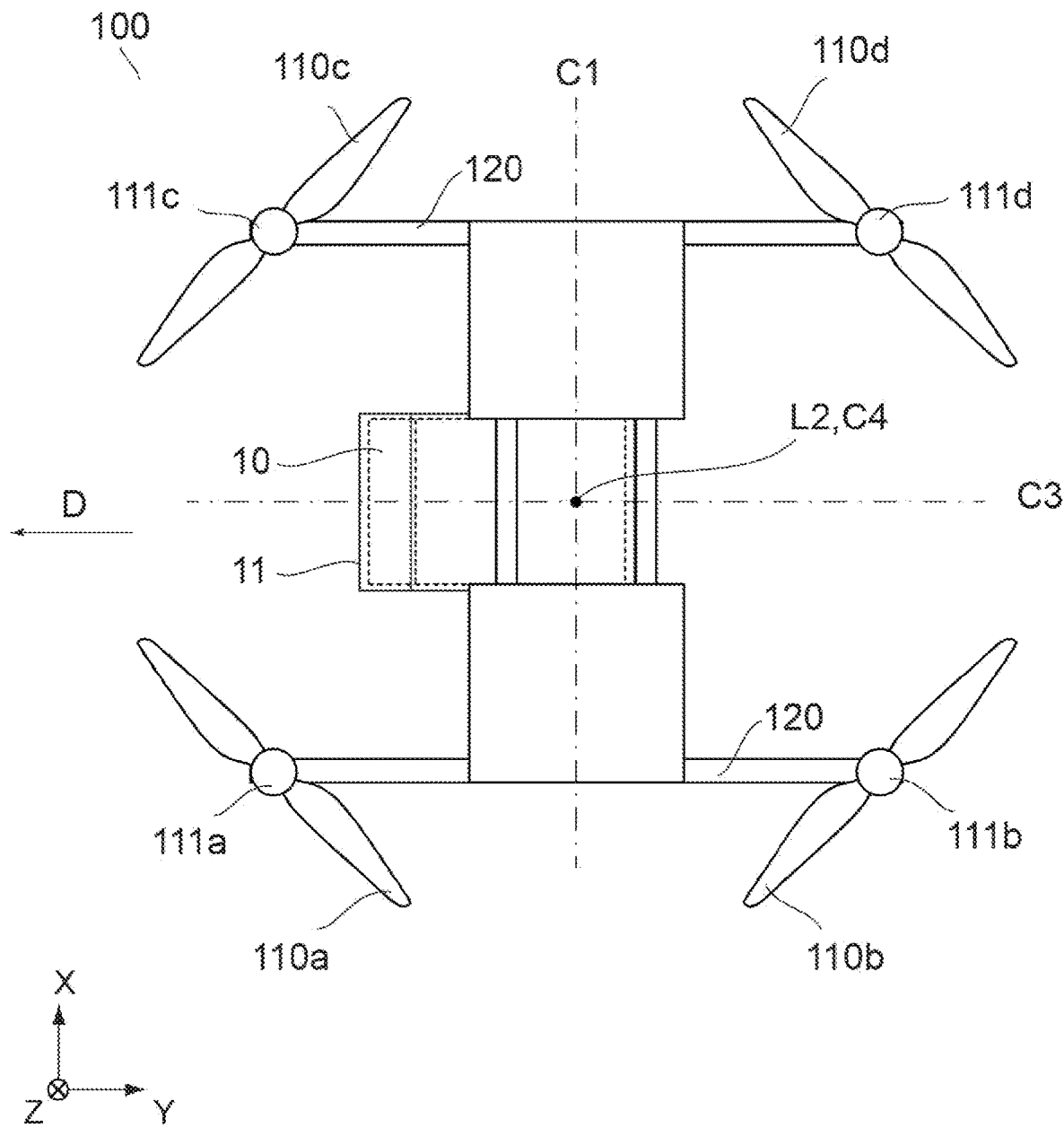
FIG. 3 is a schematic view of the flying object of FIG. 1 from the top.

Referring now to FIG. 1 and FIG. 3, the center B1 of the loading part 11 of this embodiment is forward of the center position C1 in the front-rear direction of the flying object 100 in the landing or hovering state, viewed from the side (+X and −X directions) relative to the direction of travel (front-rear direction) D. It is desirable to be provided below any of the following (1) to (3). (1) Lift-generating area L1 (lift-generating center point L2) (2) Center position C2 in the vertical direction of flying object 100 (3) Center of gravity G1 of flying object 100

The center of gravity G2 of the loading part 11 is forward of the center position C1 of the flying object 100 in the landing or hovering state, viewed from the side (+X and −X directions) relative to the direction of travel (front-back direction) D and lower than any of (1) through (3) above. The same or similar effect can be obtained thereby.

The center of gravity G1 of the flying object 100 in this embodiment means the overall center of gravity of the flight part and the main body part. The center of gravity G3 means the overall center of gravity of the flight part, main body part, loading part, and payload. Additionally, in the rotorcraft 1 according to this embodiment, the lift generation area L1 is a region that includes the width (the length along the vertical direction Z in FIG. 1) of the blades of each propeller 110. In this lift generation area L1, there can be a lift generation center point (lift center) L2 based on the position of each of the propellers 110 in plan view. The lift center L2 is located at the geometric center position in plan view of each of the propellers 110 when the output of each of the propellers 110 is substantially the same.

If, for example, each of the propellers 110 is provided by a mixed form of push and pull types or is provided in staggered levels, the lift generation area L1 is defined as follows. First, obtain the positions of the upper and lower ends of the propeller 110 blades in the width direction (height direction in rotorcraft 1) at each of the rotation axes of the motor 111. The space enclosed by the least-squares plane obtained by the point groups corresponding to each of the upper end positions at each of the rotation axes and the least-squares plane obtained by the point groups corresponding to each of the lower end positions at each of the rotation axes can be defined as the lift generation area L1. The position of the lift center L2 in this case is the same as in the case described above.

The center position C1 of the flight part means the center position between the front and rear ends of the flight part in the front-rear direction D. The center position C2 of the flight part means the center position between the top and bottom ends of the flight part in the vertical direction. The intersection of the center position C3, which is the center between the right and left ends of the flight part, and the center position C1 is the center position C4 in the top view of the flying object.

Figure 7:
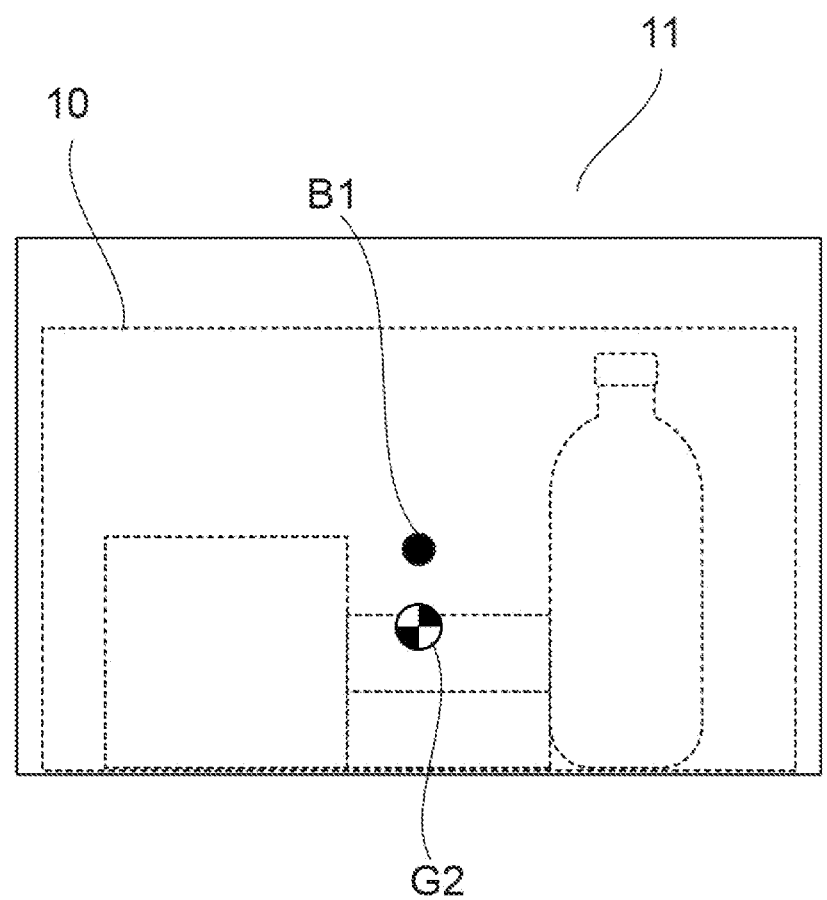
FIG. 7 is a side view of the load mounted on a flying object.
Figure 7:
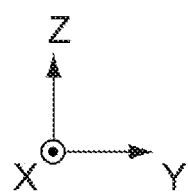

As illustrated in FIG. 7, it is common for the payload 10 to be placed on the bottom side of the loading part 11. Also, in cases where the payload 10 is a box or the like containing a plurality of goods, it is also common for the goods to be placed on the bottom side inside the payload. Therefore, the center of gravity G2 of the loading part 11 is likely to be below the center of the loading part. In other words, by setting the center point B1 of the loading part lower than any of the aforementioned (1) through (3), the center of gravity G2 of the loading part 11 can also be lower than any of (1) through (3) in many cases. This makes the center of gravity G3 more forward (+Y) and downward (−Z) in the landing or hovering state, compared to the center of gravity G1 of the flying object.

Figure 13:
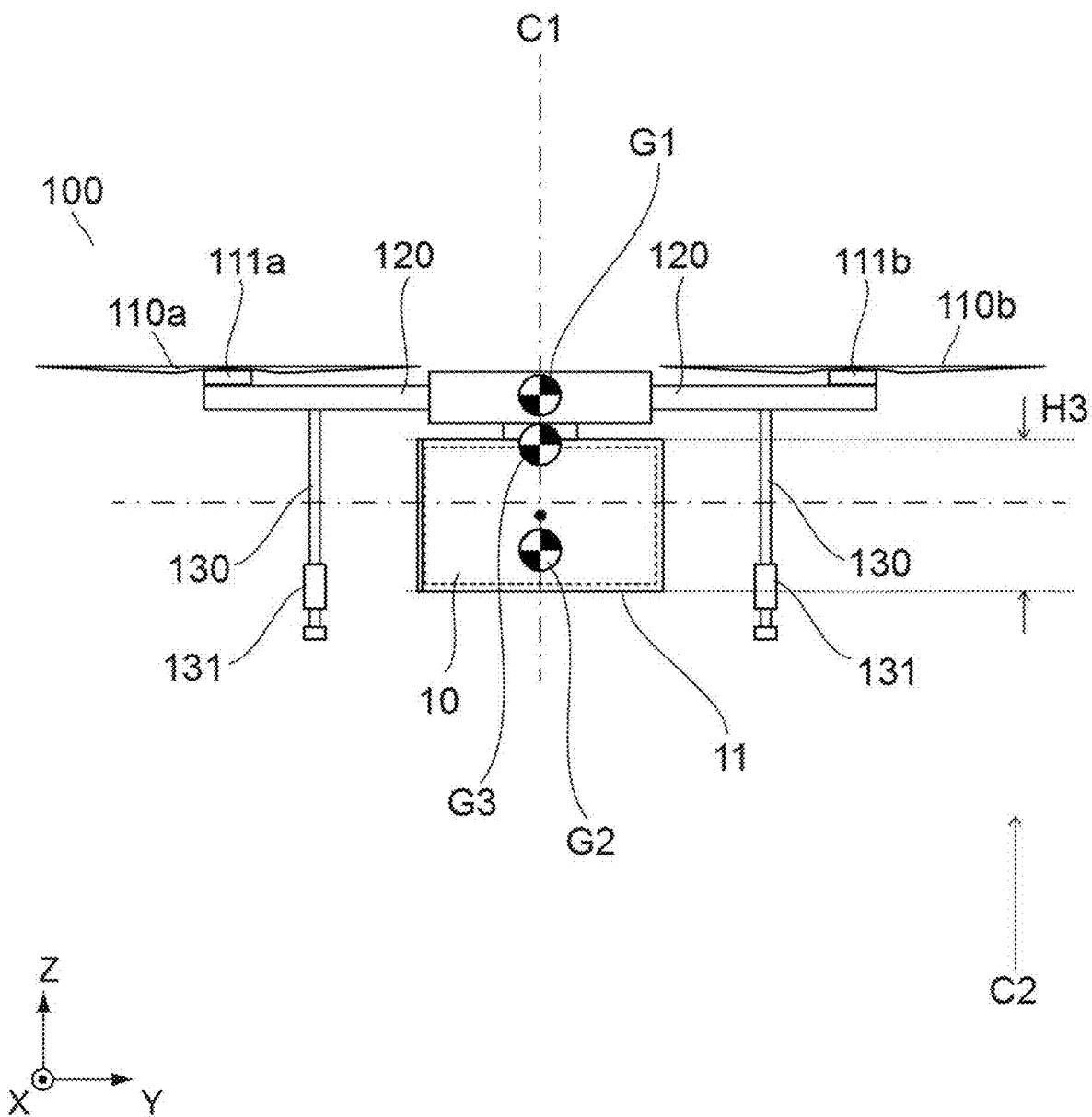
FIG. 13 is a schematic view of an existing flying object seen from the side.
Figure 14:
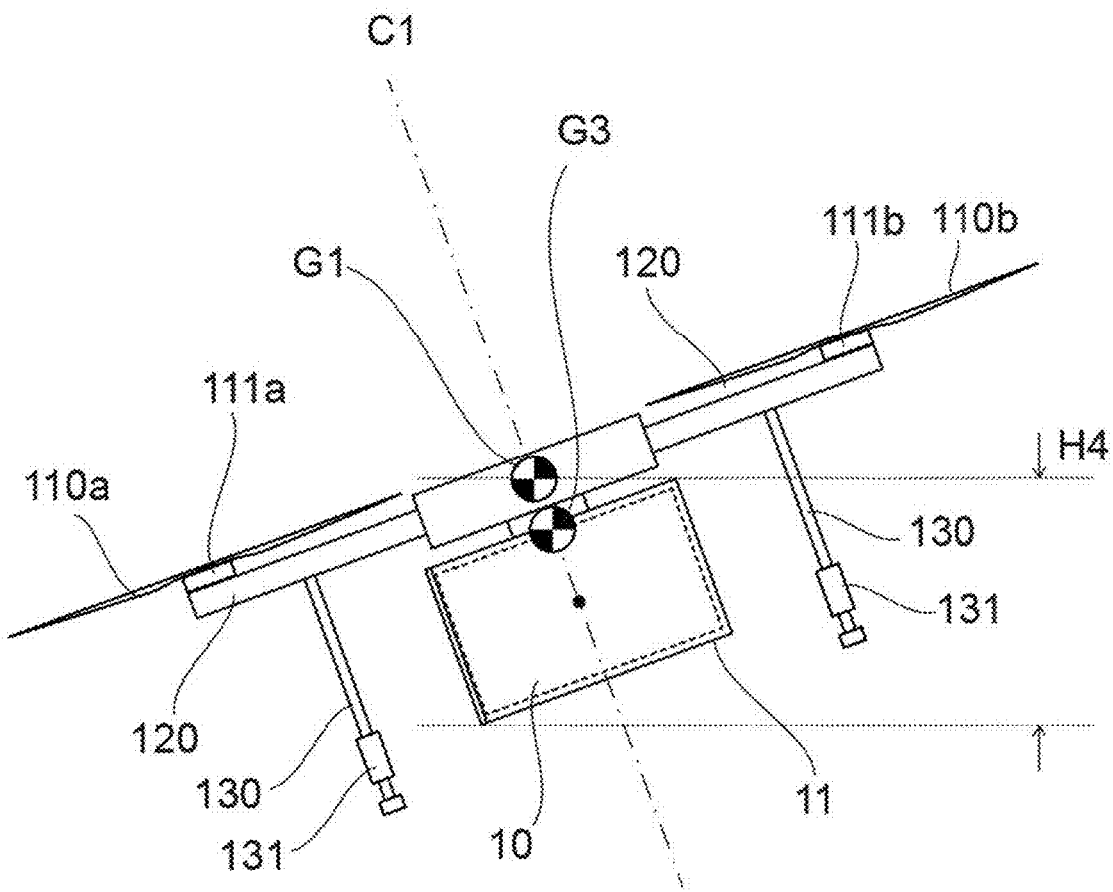
FIG. 14 is a view of the flying object of FIG. 13 in a cruising attitude.
Figure 15:
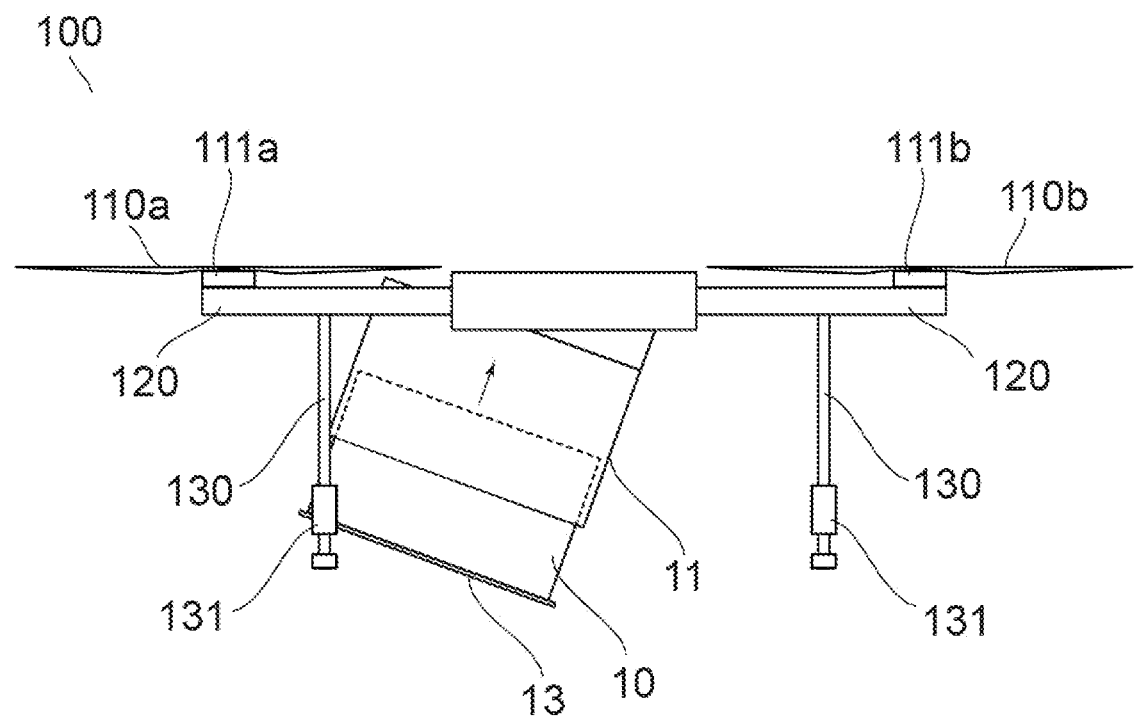
FIG. 15 is a side view of an example of how to mount a load on a flying object.

In conventional rotorcraft as shown in FIG. 13 and FIG. 14, which do not take into account the position of such center of gravity G3, the rear of the rotorcraft must be lifted and the front must be lowered because the rotorcraft must be tilted for cruising. In this case, the lift of the rear propeller must be greater than that of the forward propeller. In this way, the speed of the motor in the rear during forward motion will be greater and the speed of the rotor in the front will be less. Thus, variations in motor speed can occur. Furthermore, since the payload is connected to the central lower part of the flying object, the center of gravity G3 is rear of the flying object, and the difference in the number of rotations of the motors becomes larger.

FIG. 2 shows an example of the flying object 100 in this embodiment in cruise flight. The flying object 100 shown in FIG. 2 is inclined with respect to the direction of travel D and is flying in the direction of travel D. At this time, the center of gravity G3 of the flying object 100 is closer to the center of lift L2 (e.g., lower and in the direction of travel than the conventional aircraft) than in the conventional rotorcraft shown in FIG. 13.

When cruising in such an attitude, the variation in the load on the motor 111 that can be generated for the flying object 100 is reduced due to the positional relationship between the lift center L2, which is the center that generates lift in the direction of height Z, and the center of gravity G3. As a result, the lift generated by the front propeller 110 *a* and the lift F2 generated by the rear propeller 110 *b* can be less different when the rotorcraft 1 is inclined with respect to the direction of travel than when a conventional rotorcraft is inclined in the same manner. Then the difference in the number of rotations of motors 111 *a* and 111 *b* will also be smaller.

In this embodiment of the flying object 100, when the flying object 100 is inclined in the direction of travel D during cruising, the difference in the number of rotations of the front motor 111*a* and the rear motor 111*b* can be reduced. This can reduce the variation in battery consumption (i.e., energy consumption) due to the difference in motor speeds during cruise. This can, for example, further extend the cruising time. The load on the motor can also be homogenized, allowing the motor to be operated more efficiently. Thus, it is possible to improve the efficiency of the operation of rotorcraft in cruise.

By positioning the flight part and the loading part 11 as described above, the speed of each of the motors 111 can be averaged in the cruise of the flying object 100. This reduces the variation in the power output by the motors 111 and the accompanying effects. Thus, the operation of the flying object 100 over long distances, etc., can be made more efficient.

The size of payloads transported by flying objects may be required to be larger in recent years. For example, when delivering multiple items to remote islands or villages instead of to individual homes, transportation efficiency may be increased by loading them together.

However, as the volume of the payload or loading part increases, the drag force on the flying object 100 as it moves may increase.

For example, as shown in FIG. 13, when the loading part is mounted at an angle that tilts backward during landing and hovering compared to when the aircraft is in cruising attitude (for example, if the aircraft is mounted at an angle where it is tilted forward during cruise attitude and leveled during landing and hovering), as shown in FIG. 14, the front projected area of the loading part (the area of the loading part when viewed from the front of the aircraft) increases when the flying object is tilted forward compared to when landing and hovering (for example, when comparing the total height of the loading part H3 during landing and hovering to the total height of the loading part H4 during cruising attitude, H4 is larger).

In this embodiment, the loading part 11 or payload 10 is mounted at a predetermined angle to reduce the increase in the front projected area of the flying object during cruising attitude and to prevent a decrease in flight efficiency. The predetermined angle should be an angle at which the front projected area or drag force of the flying object during cruising is smaller than during landing or hovering.

As illustrated in FIGS. 1 and 2, when the loading part is mounted at an angle where the loading part is tilted backward (forward toward the direction of travel) in the forward/backward direction during landing and hovering, and at an angle where the loading part is closer to horizontal (substantially horizontal) during cruise than during landing and hovering, the front projected area of the loading part when the flight object is tilted forward is reduced compared to when landing or hovering (for example, when comparing the total height of the loading part H1 when landing or hovering with the total height of the loading part H2 at cruising attitude, H2 is smaller).

Figure 16:
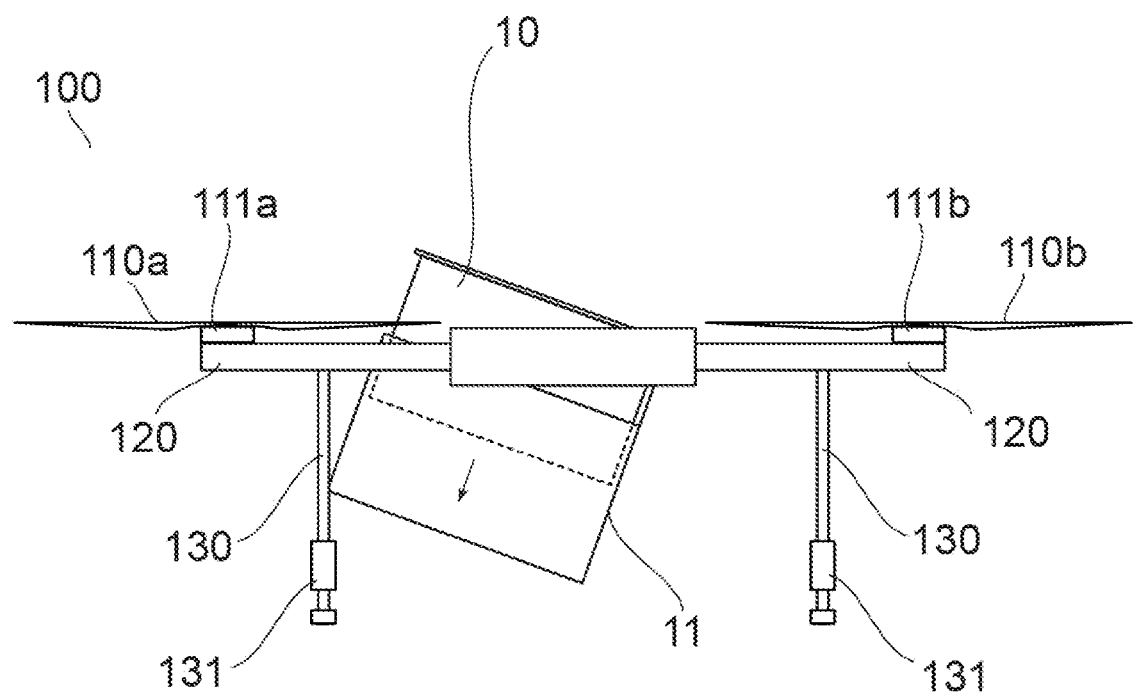
FIG. 16 is a side view of an example of a method of loading a payload onto a flying object.
Figure 16:
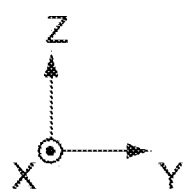
Figure 17:
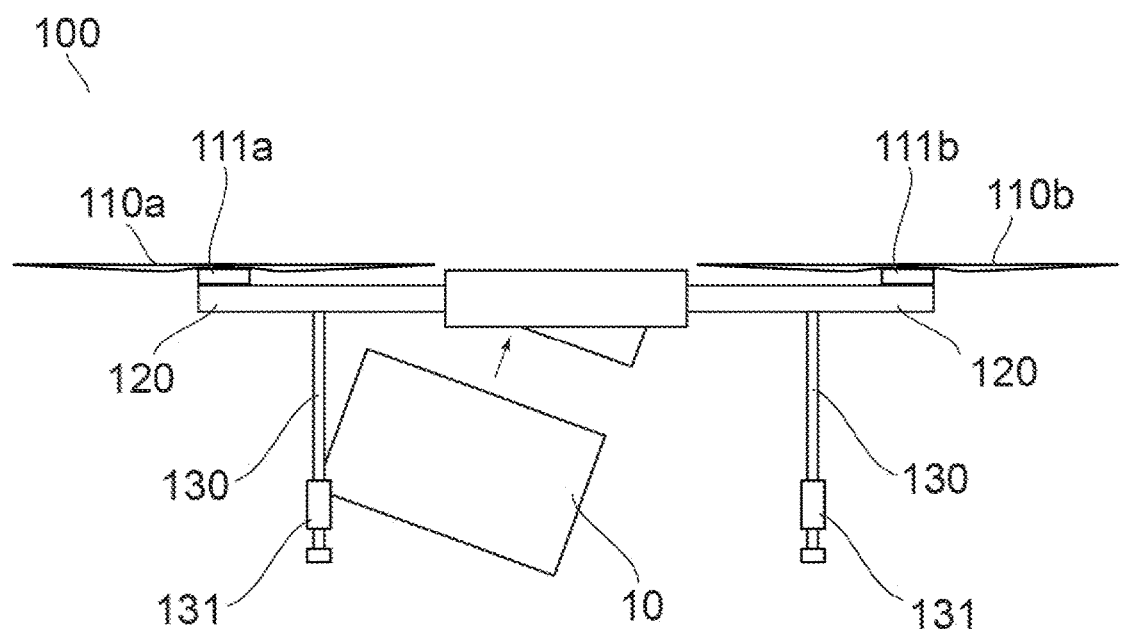
FIG. 17 is a side view of an example of a method for loading a payload to a flying object.

As illustrated in FIG. 17, the payload itself may be attached and secured to the flight part or main body part with the payload tilted at a predetermined angle, or the payload 10 may be placed on the loading part 11 provided at a predetermined angle in advance, as illustrated in FIGS. 4 and 5, 15 and 16.

Figure 4:
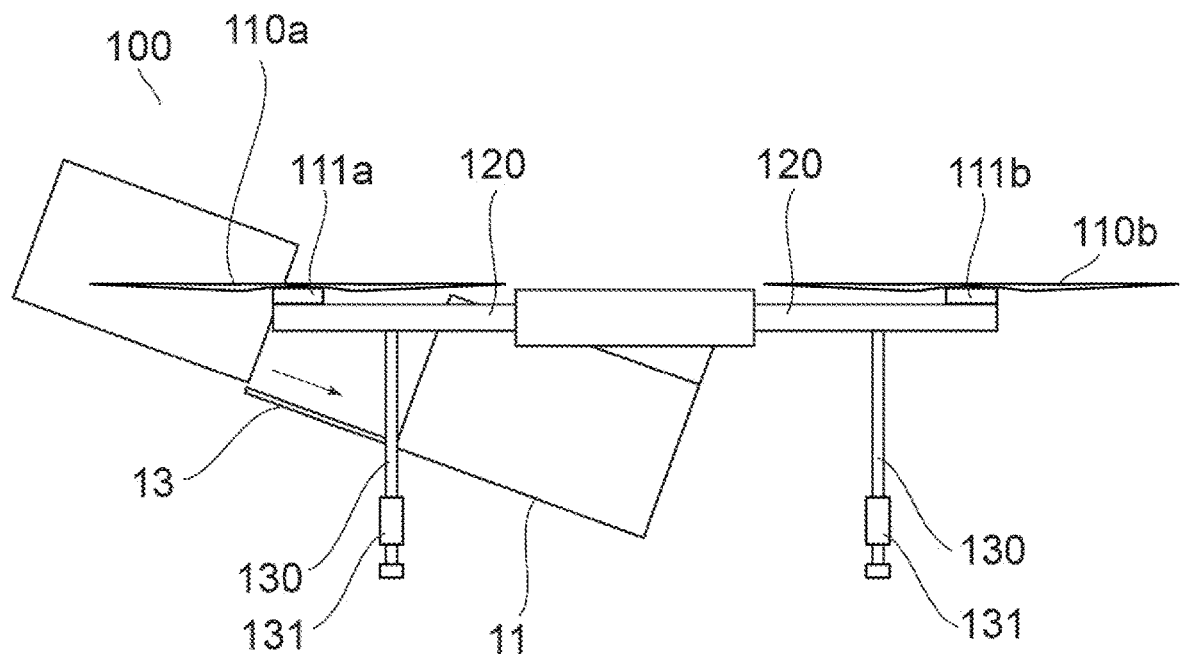
FIG. 4 is a side view of an example of how to mount a load onto a flying object.
Figure 4:
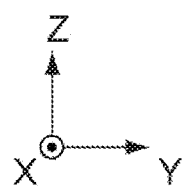
Figure 5:
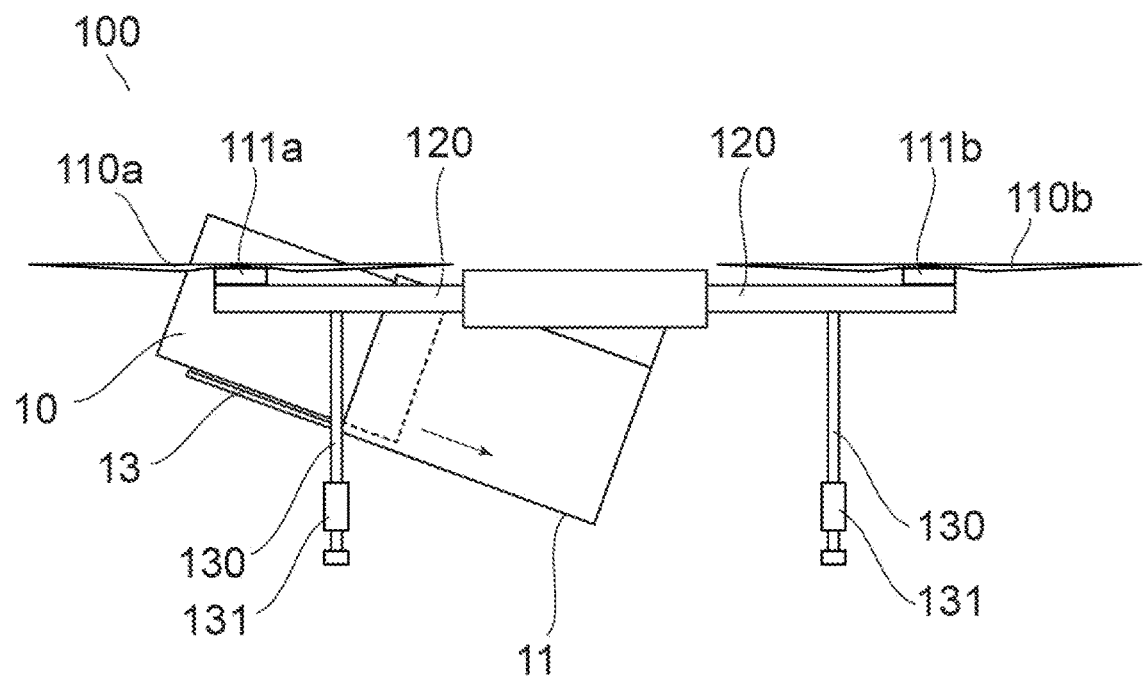
FIG. 5 is a side view of the flying object shown in FIG. 4 with the load being mounted.

When loading objects by hand, if the objects are heavy, it may be difficult to push them up from below the flying object. Especially in such cases, it is possible to simplify the loading of the payload onto the loading part by configuring the flying object accessible from the front and above the flying object as shown in FIG. 4, or from above the flying object as shown in FIG. 16. When using the loading method as shown in FIG. 16, the loading part or main body part can be provided with an opening through which the payload can pass, allowing the payload to be placed without obstruction.

DETAILS OF THE SECOND EMBODIMENT

In the details of the second embodiment of this invention, the components that overlap with those of the first embodiment operate in the same manner, so they will not be described again.

The payload 10 may be packed in stackable shaped components such as trays, plates, etc. (hereinafter collectively referred to as "a tray member"). In recent years, the number of payloads delivered to homes and businesses has increased due to the spread of e-commerce sites and other services. The storage and disposal of packing materials that arrive with goods can increase the burden on the user and the burden on the environment. Many payloads are stored in cardboard boxes or other packing materials, which can be bulky when stored in the same form in which they arrived. By using tray members for packing payloads, the space required for storage of packing materials can be reduced, and the resources used for the materials themselves can also be expected to be reduced.

Figure 8:
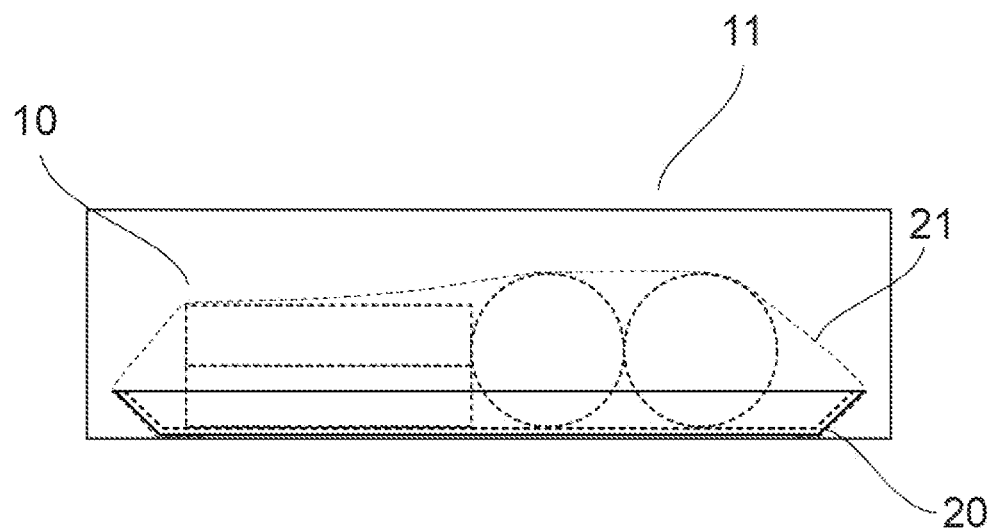
FIG. 8 is a front view of a load mounted on a flying object.
Figure 8:
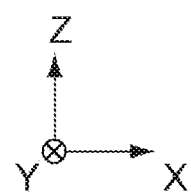

For example, as shown in FIG. 8, goods are placed on a tray member 20. A user does not receive a box of packing materials, and multiple tray members 20 can be placed on top of each other, thus reducing storage space. In addition, if cushioning is required, the user can expect to further reduce the amount of material left with the user by providing cushioning material in the loading part 11 or a shock absorbing device 131 on the landing leg 130 of the flying object.

Figure 9:
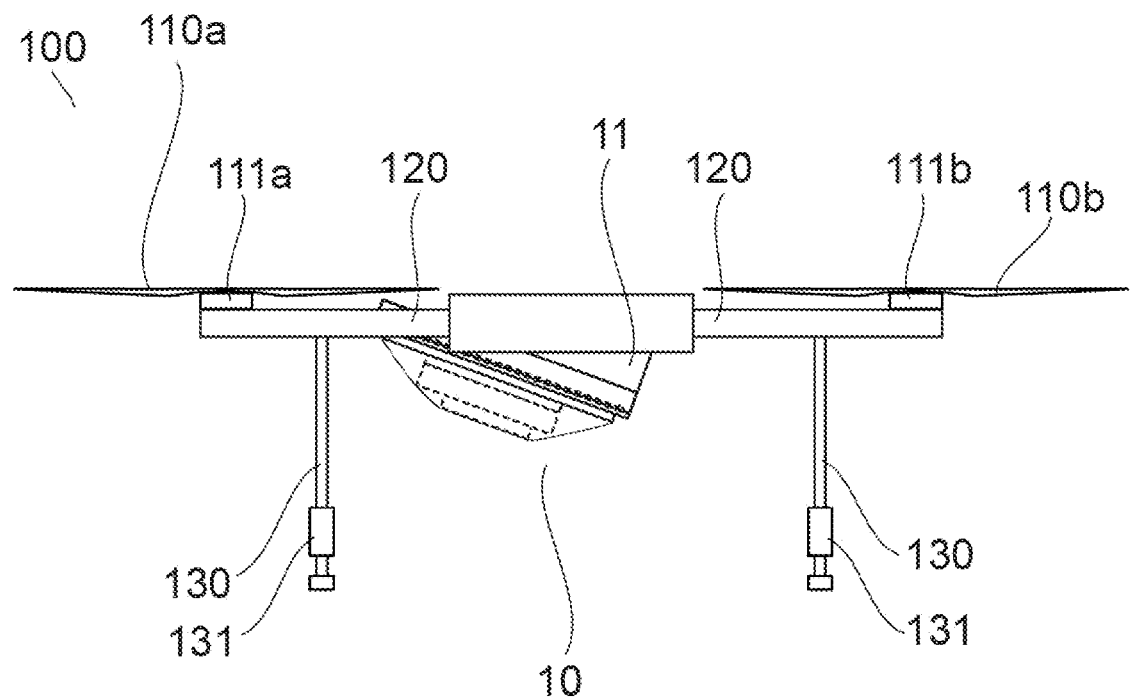
FIG. 9 is a side view of an example of a method of loading a flying object.
Figure 9:
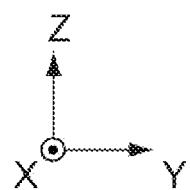
Figure 10:
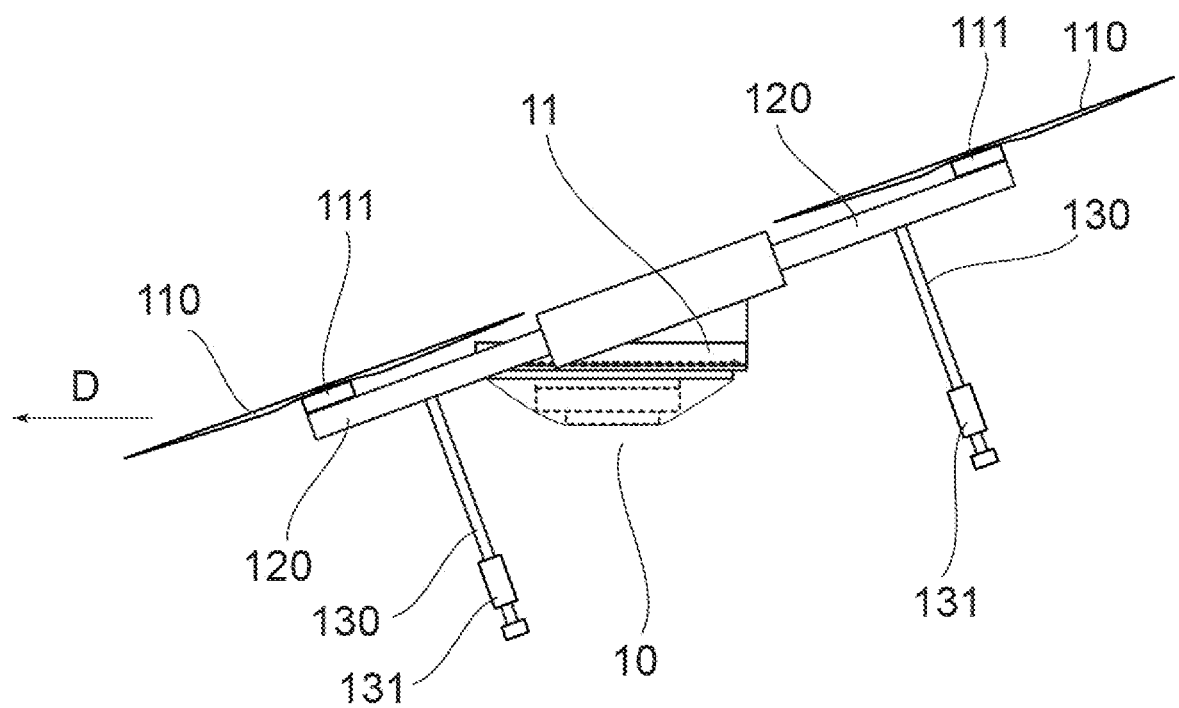
FIG. 10 is the flying object of FIG. 9 in cruising attitude.

When tray members 20 are used for packing materials, they are connected to the flying object 100 with the tray members 20 facing up and the goods facing down, as shown in FIG. 9 and FIG. 10. This minimizes the size and height of the payload and reduces the frontal projected area of the flying object during cruise compared to using a box-shaped loading part, which is more effective in reducing drag and improving fuel efficiency.

Figure 11:
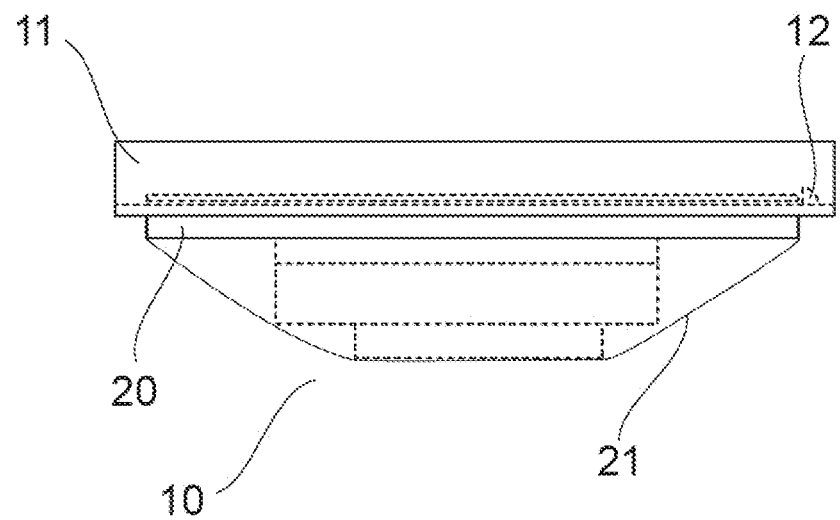
FIG. 11 is a side view of an example of connecting a load to a flying object.
Figure 12:
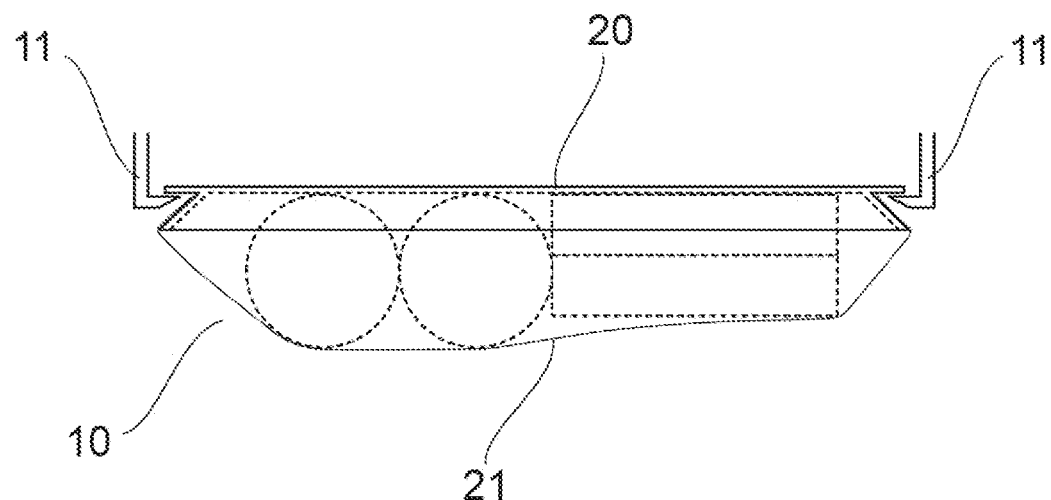
FIG. 12 is a front view of the connection example shown in FIG. 11.
Figure 12:
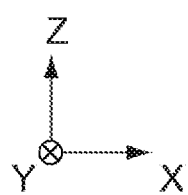

As an example of a method of connecting the tray member 20 to the flying object 100 with the tray member 20 facing upward, a rail-like suspension member is provided in the loading part 11 as shown in FIGS. 11 and 12 (e.g., on the two opposing sides). In this case, to prevent the load 10 from unintentionally slipping off the rail due to the inclination of the flying object, a protruding anti-slip 12 or the like may be provided as shown in FIG. 12.

The method of connecting the tray member 20 to the flying object can be any method that does not unintentionally separate the tray member or the payload, and in addition to the method using the rail-like member described above, examples include fixing members with strings, belts, hook and loop fasteners, latch lock mechanisms, magnetic attachment and adsorption, and hanging by string-like members. However, this is not limited to these methods.

The above examples have configurations in which the loading part 11 or the payload 10 is placed in the lower front from the viewpoint of the center of gravity. From the viewpoint of leveling the angle of the loading part 11 or the load 10 during cruising, even a configuration like that shown in FIG. 18-FIG. 21 will have the effect of reducing the front projected area of the loading part 11. In other words, the aerodynamic drag of the loading part 11 or payload 10 during cruising of the flying object 100 can be reduced and the flight efficiency can be improved.

Figure 18:
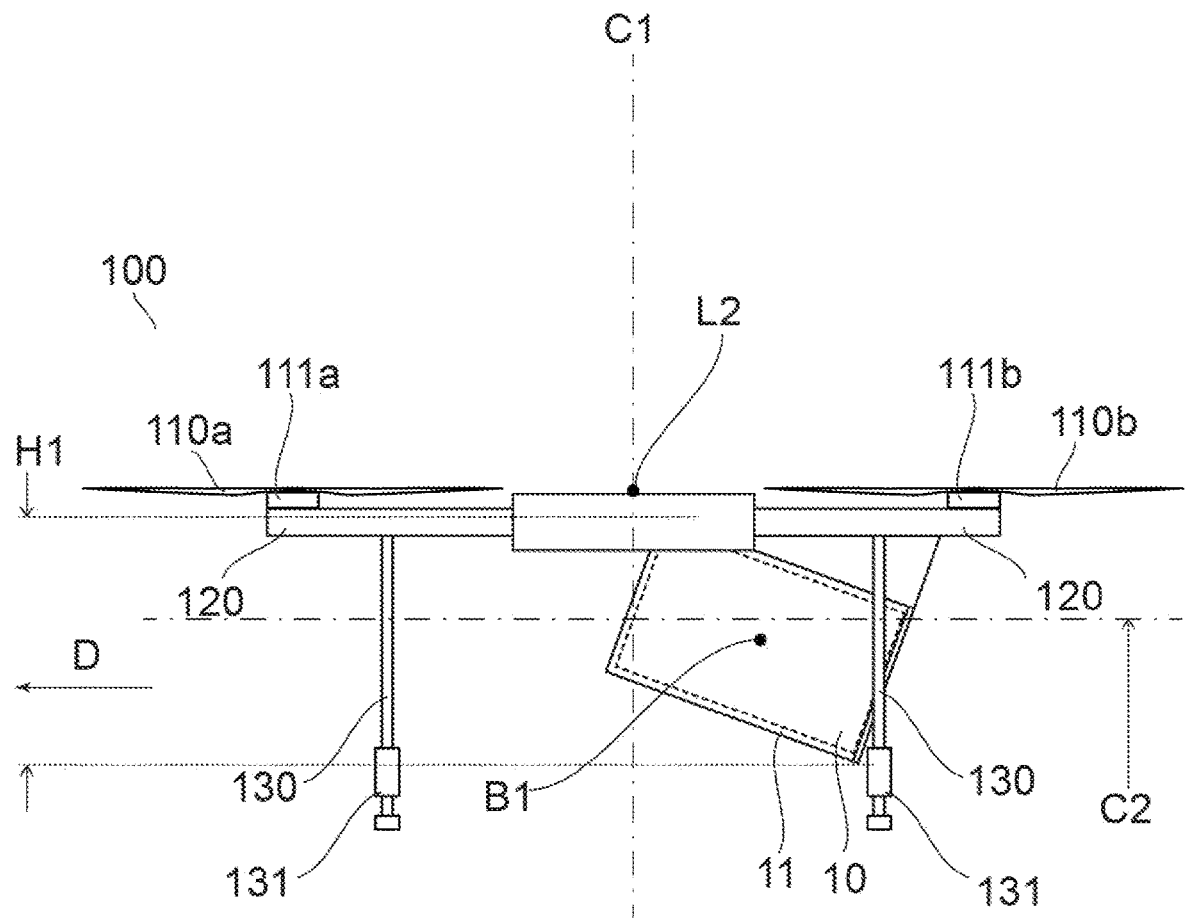
FIG. 18 is a side view of an example of a loading position of a payload.
Figure 18:
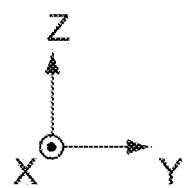

In FIG. 18, the center B1 of the loading part is located behind the center position of the airframe in the front-rear direction and below any of (1) to (3) above. In this case, the center of gravity G3 is rearward (−Y) and downward (−Z) compared to the flying object's center of gravity G1 in the landing or hovering state.

Figure 19:
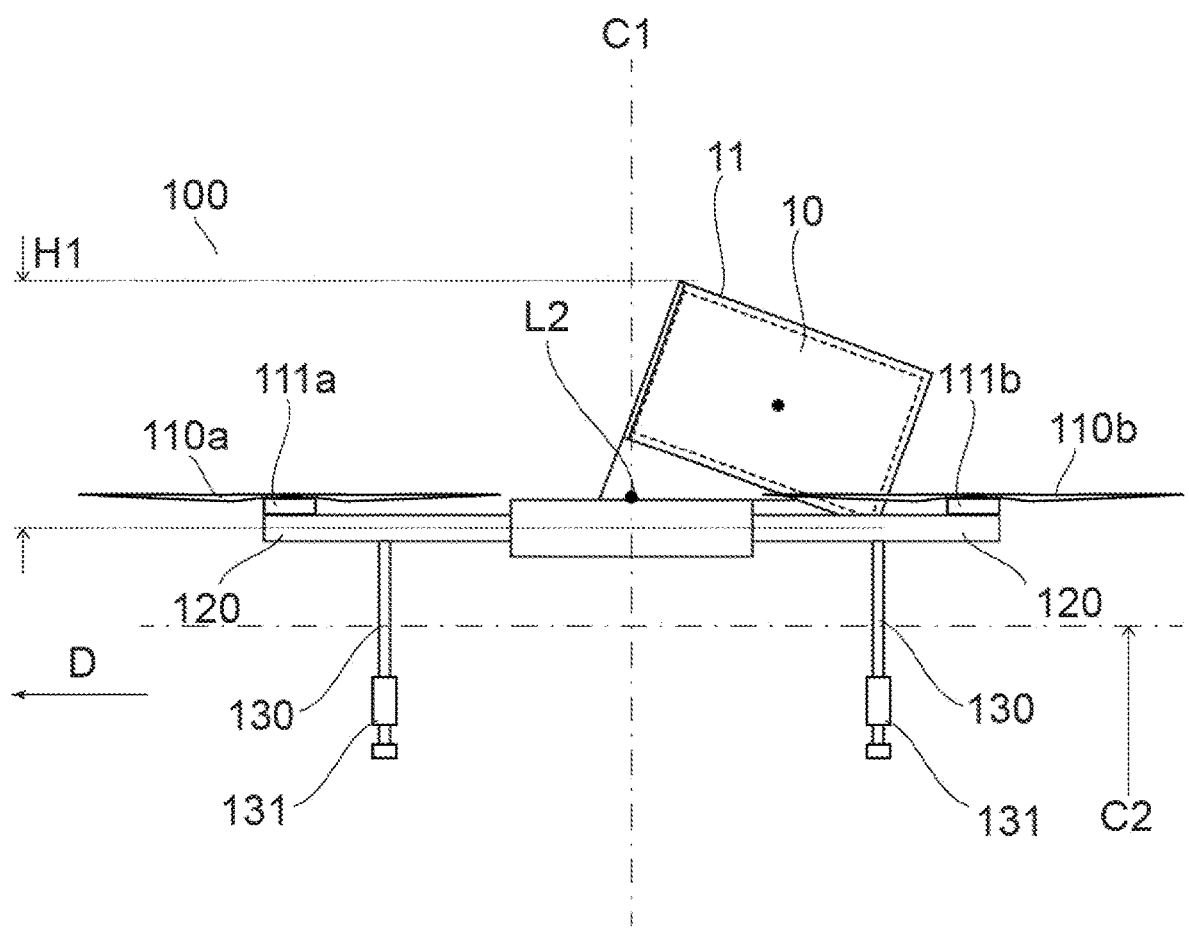
FIG. 19 is a side view of an example of a loading position of a payload.
Figure 19:
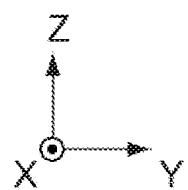

In FIG. 19, the center B1 of the loading part is located aft of the center position of the airframe in the forward/backward direction and above any of (1) through (3) above. In this case, the center of gravity G3 is rearward (−Y) and upward (+Z) compared to the flying object's center of gravity G1 in the landing or hovering state.

Figure 20:
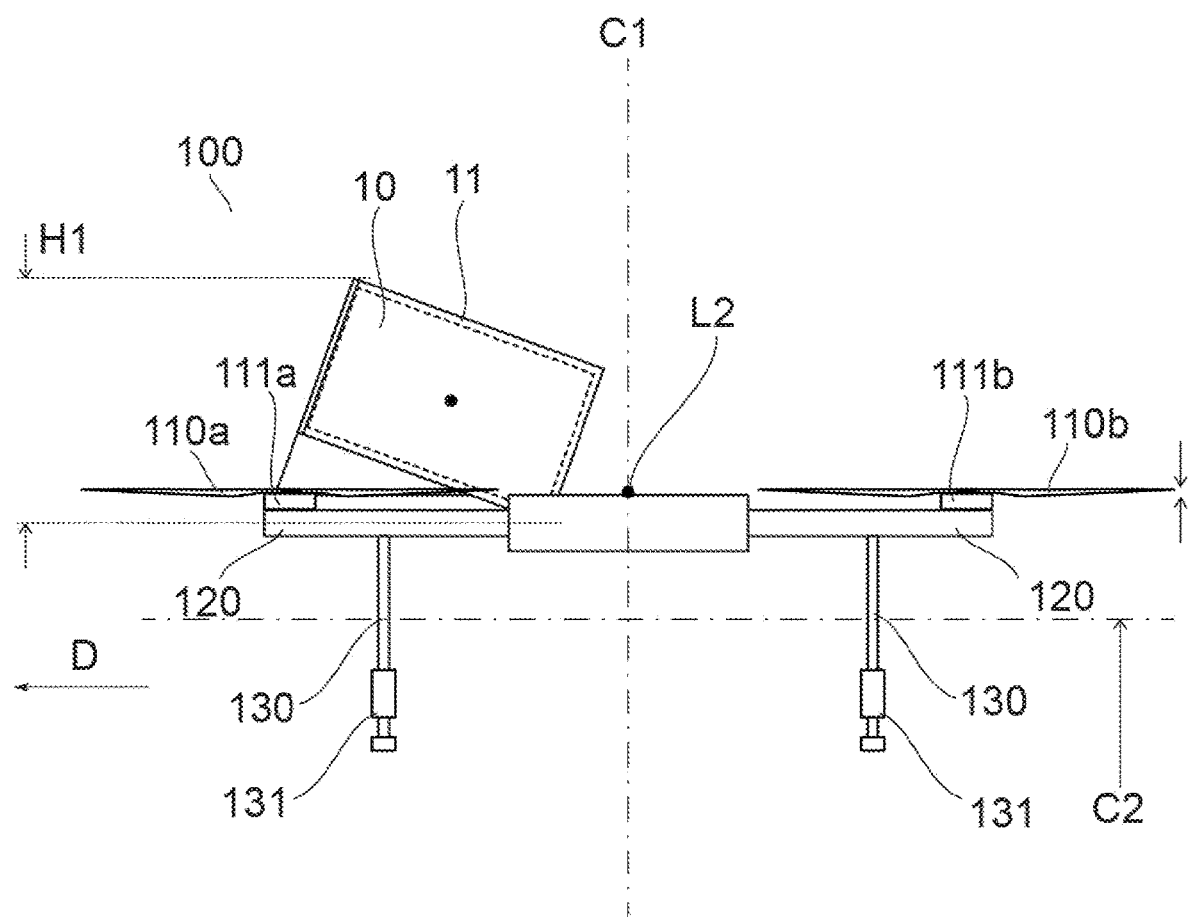
FIG. 20 is a side view of an example of a loading position of a payload.

In FIG. 20, the center B1 of the loading part is located forward of the center position of the airframe in the front-rear direction and above any of (1) through (3) above. In this case, the center of gravity G3 is forward (+Y) and upward (+Z) compared to the flying object's center of gravity G1 in the landing or hovering state.

Figure 21:
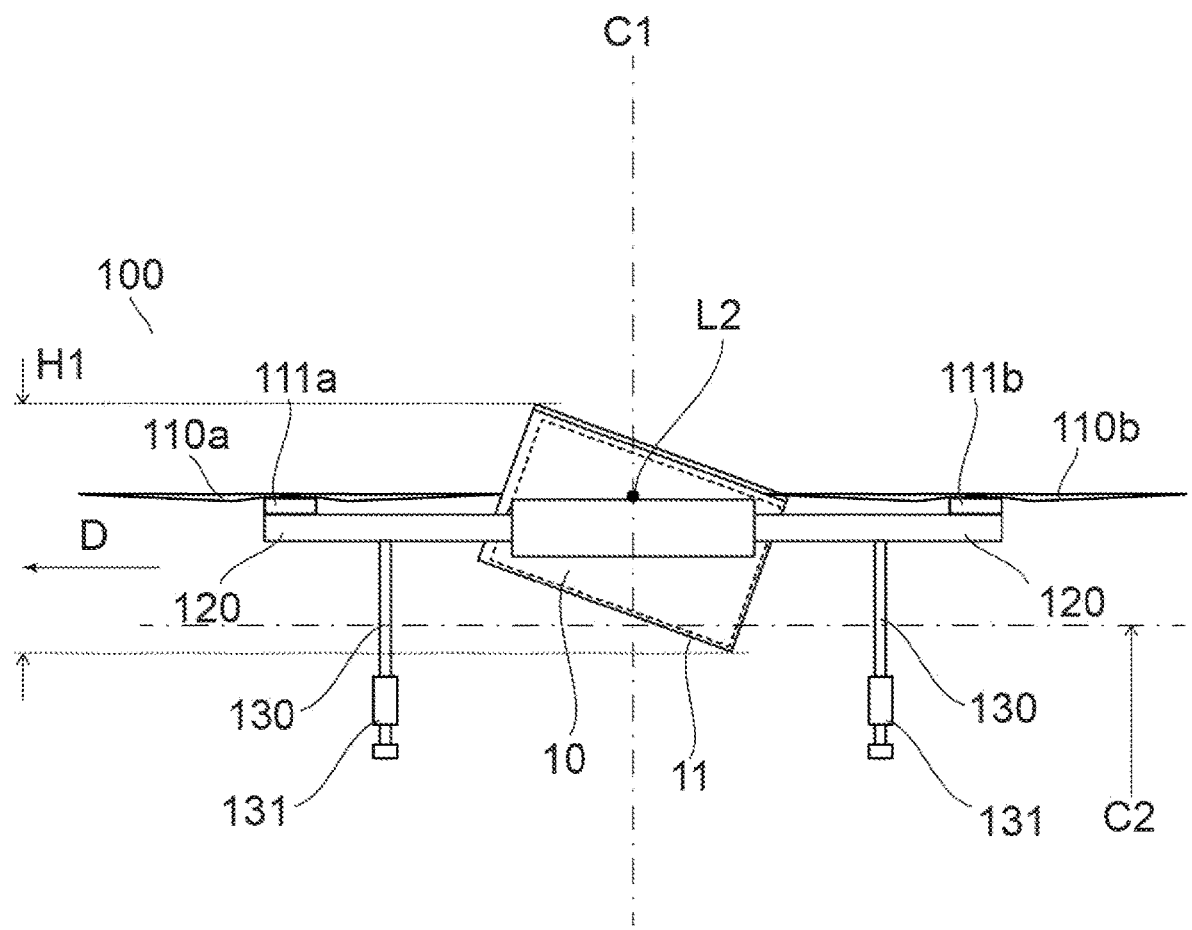
FIG. 21 is a side view of an example of a loading position of a payload.
Figure 21:
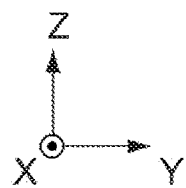

In FIG. 21, the center B1 of the loading part coincides or substantially coincides with the center position of the airframe in the front-rear direction. In this case, the center of gravity G3 is substantially the same position in the front-rear and vertical direction or lower (−Z) in the vertical direction than the center of gravity G1 of the flying object in the landing or hovering state.

Figure 22:
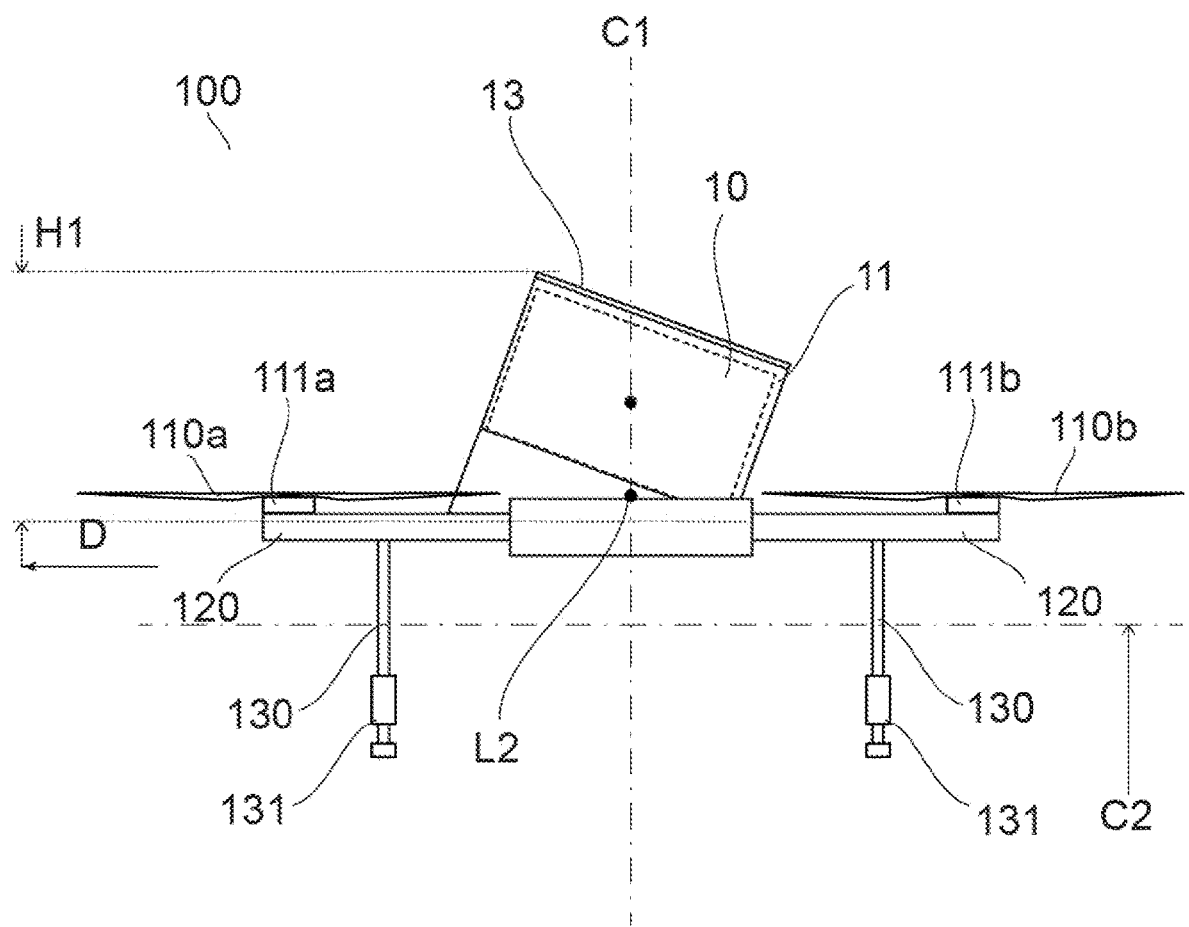
FIG. 22 is a side view of an example of a loading position of a payload.
Figure 22:
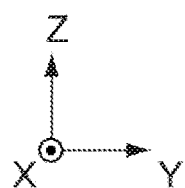

In FIG. 22, the center B1 of the loading part coincides with or substantially coincides with the center position of the airframe in the front-rear direction and above any of (1) to (3) above. In this case, the center of gravity G3 is substantially the same position and higher (+Z) than the center of gravity G1 of the flying object in the front-rear direction in the landing or hovering state.

Figure 23:
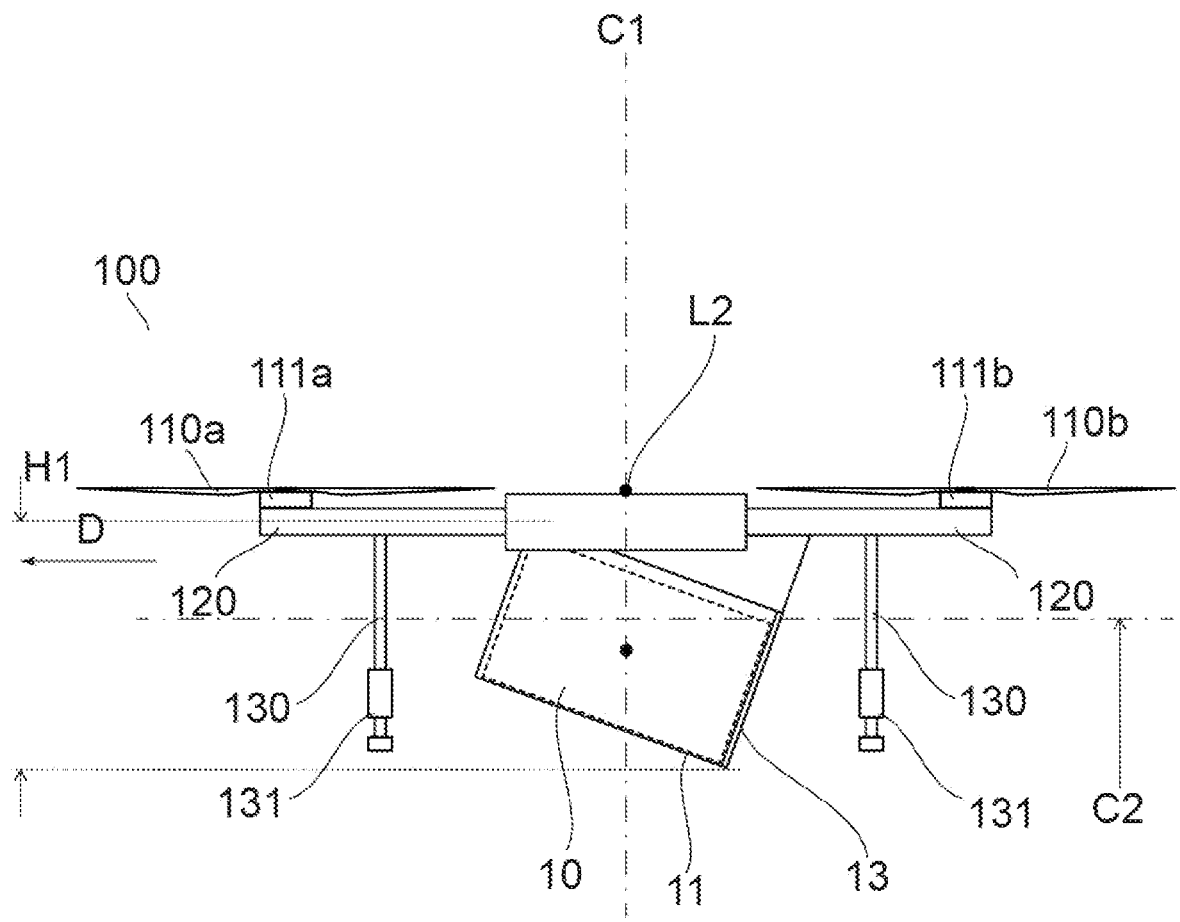
FIG. 23 is a side view of an example of a loading position of a payload.

In FIG. 23, the center B1 of the loading part is located at the center of the airframe in the front-rear direction and below the center point of lift generation. In this case, the center of gravity G3 is substantially the same position in the front-rear direction and the same position or higher (−Z) in the vertical direction compared to the flying object's center of gravity G1 in the landing or hovering state.

The reduction in the frontal projected area of the loading part during flight object cruise is achieved, as in the above example, by making H2 smaller when comparing the total height of the loading part H1 when the flying object is landing or hovering with the total height of the loading part H2 at cruise attitude.

In addition, the bottom surface of the loading part is no longer tilted backward but close to horizontal, which decreases the angle corresponding to the angle of attack. This prevents the bottom of the loading part from generating unintended lift, which is expected to prevent the rotor blades from reducing the efficiency of propulsion.

For example, if the loading part 11 or the load 10 is installed tilted backward at a predetermined angle to the flight object in a landing or hovering state, the front projected area of the loading part and the load itself will decrease when the flying object is tilted forward. Furthermore, when the loading part 11 or the load 10 is positioned behind and below the center of the flying object as shown in FIG. 18 or in the center of the flying object as shown in FIG. 21, in the frontal view of the flying object as a whole, the frontal projected area of the flying object is reduced because the loading part or the load overlaps with the main body part of the flying object when the flying object is tilted forward.

In the flying object illustrated in FIG. 20-FIG. 22, the loading part 11 is tilted backward at a predetermined angle and the loading part 11 is provided near the center of the flying object in the side view. By providing the load near the center of the flying object in the front-rear direction, the operating speed of the flying object in the pitch direction is increased.

When placing a payload 10 on a box-shaped loading part 11 inclined at a predetermined angle, an opening provided by the loading part should have a surface and a width that allows loading and unloading of the payload. For example, as illustrated in FIG. 24-FIG. 27, the load can be stored from the front bottom or rear bottom, from above or below the loading part, or from the side of the loading part. It is preferable to select a suitable method of storing the load depending on the location of the loading part and the method of operating the flying object.

Figure 24:
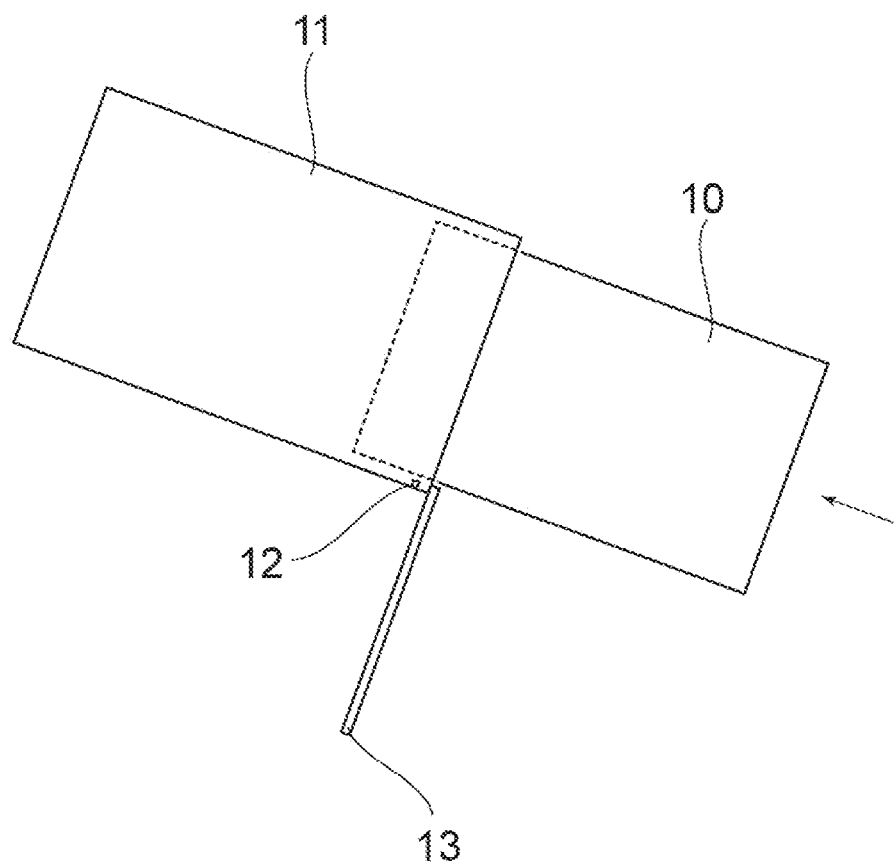
FIG. 24 is a side view of an example of a loading direction of a payload.
Figure 24:
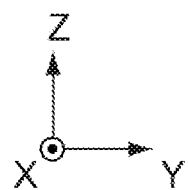
Figure 25:
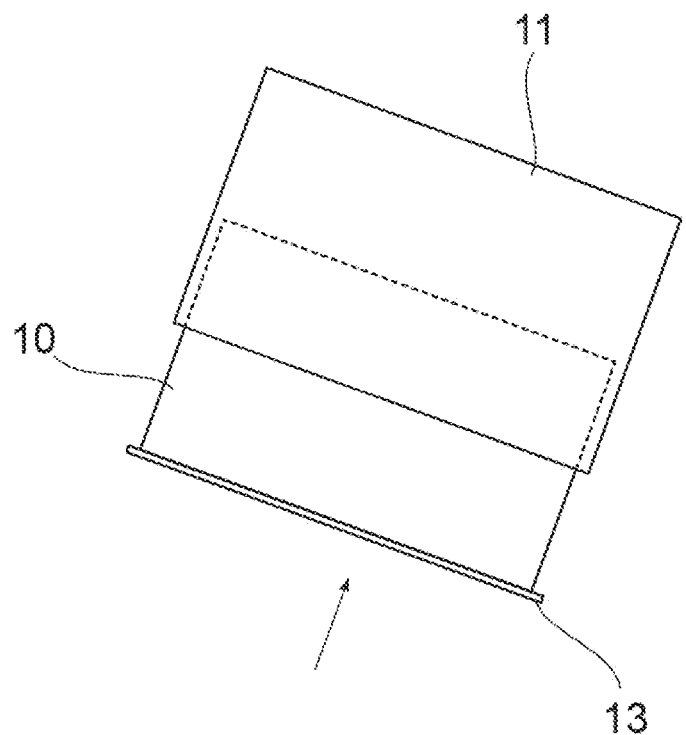
FIG. 25 is a side view of an example of a loading direction of a payload to a flying object.
Figure 25:
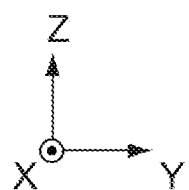
Figure 26:
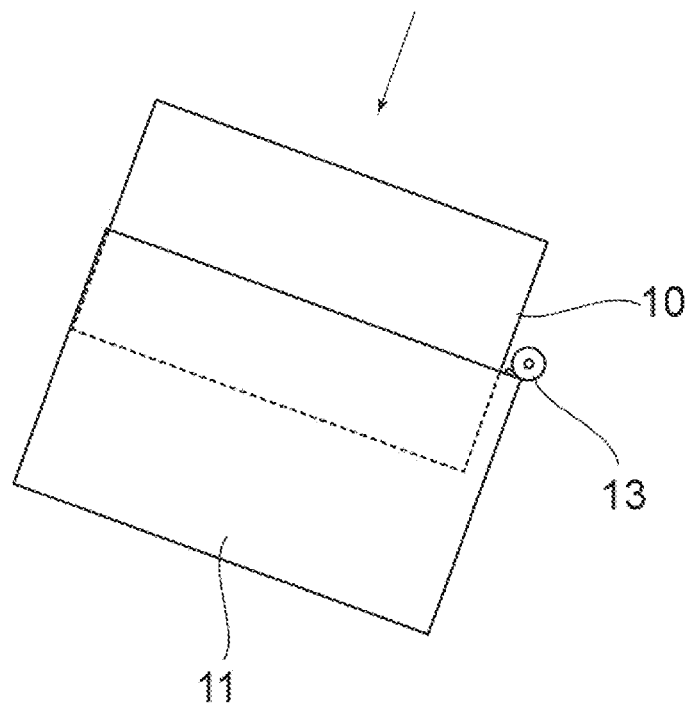
FIG. 26 is a side view of an example of a loading direction of a payload to a flying object.
Figure 26:
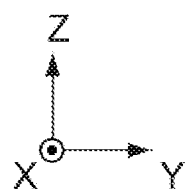
Figure 27:
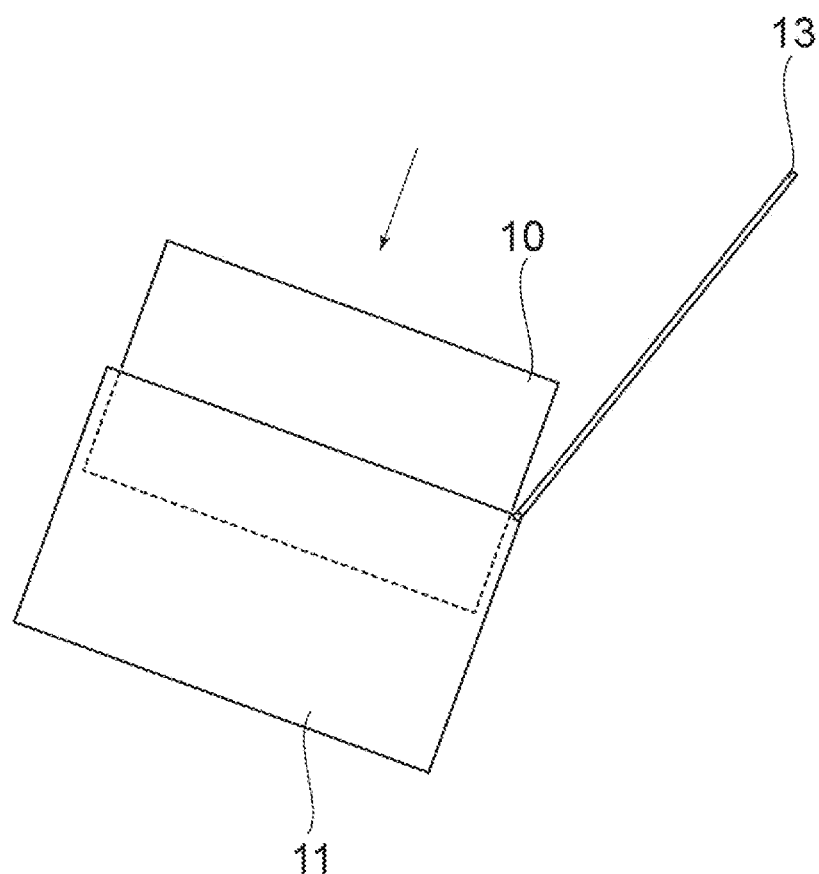
FIG. 27 is a side view of an example of a loading direction of a payload to a flying object.
Figure 27:
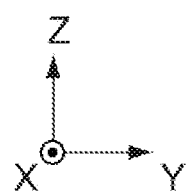

When the loading part 11 is equipped with an opening, it is preferable to use a method for opening and closing the opening that does not interfere with the storage of the payload. Examples include, but are not limited to, a sliding method as shown in FIG. 24, pivoting by a hinge or the like as shown in FIG. 27, integration of the lid member 13 and the load as shown in FIG. 25, and roll shutters as shown in FIG. 26. The lid member 13 may be waterproof or sealed to prevent the entry of wind and rain, etc., or may be strong enough to hold the load 11.

The loading part 11 is not limited to one opening, but may have two or more openings. For example, storing and detaching may be simplified by detaching the payload 10 stored from openings provided above the loading part 11 from openings provided below or to the side of the loading part 11.

As illustrated in FIGS. 18-20 and FIG. 22 and FIG. 23, the loading part 11 may be located in a position that does not penetrate the enclosed space surrounded by two or more frames 120. In this case, a deck may be provided in the center of the flying object instead of an opening to install a control unit and sensors 1002, or a plate-like member may be added to further increase rigidity.

When storing loads from below the loading part 11 and diagonally upward, the loading part should be provided with a non-slip 12. For example, as shown in FIG. 24, a protruding non-slip 12 on the loading surface can prevent the load from jumping out of the loading part even if the load slides down due to its own weight. The same effect is also obtained by using or attaching a material with a high coefficient of friction to a part or all of the loading surface to prevent the load from slipping.

Figure 28:
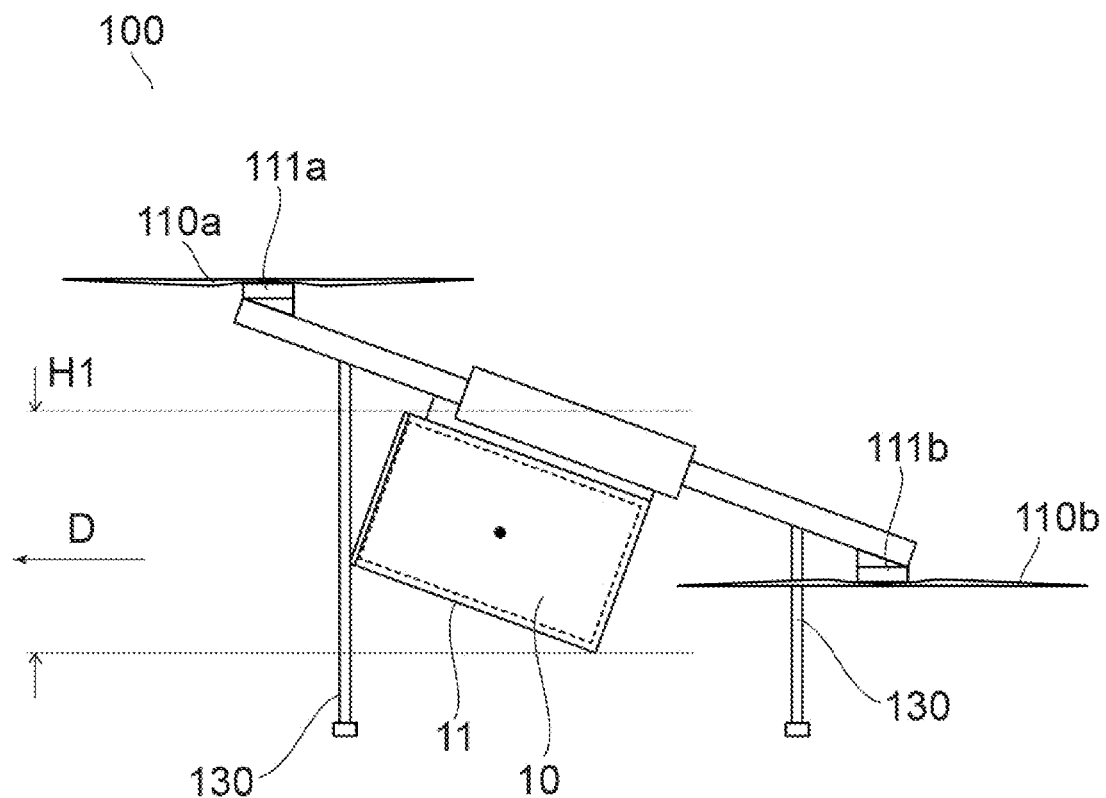
FIG. 28 is a side view of an example of a method of loading a payload to a flying object.
Figure 29:
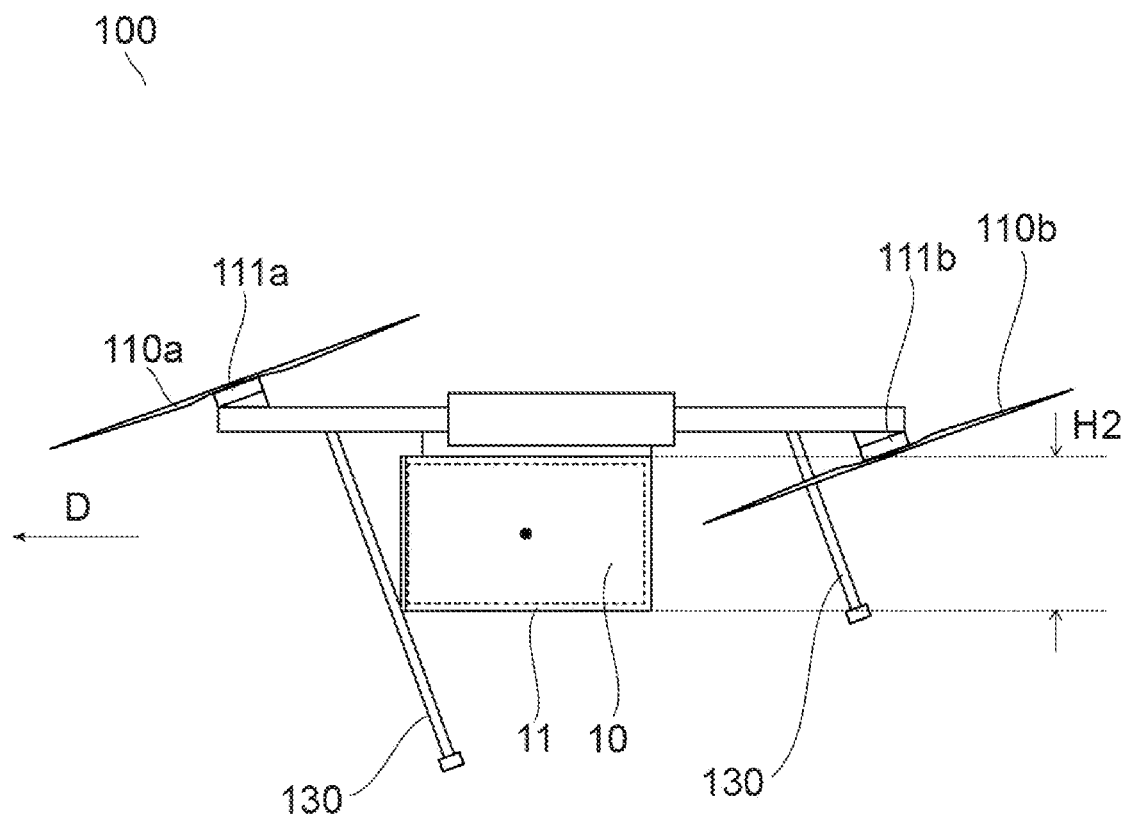
FIG. 29 is a view of the flying object of FIG. 28 in a cruising attitude.

So far, we have mentioned the improvement of flight efficiency due to the angle of the loading part 11 and the load 10, but similar configurations may be used for other flying object parts as well. For example, as shown in FIG. 28 and FIG. 29, the frame 120 or main body part of the flying object in the landing or hovering state can be tilted backward to reduce the front projected area when the flying object is cruising, thereby improving flight efficiency. At the same time, since the extension of the landing legs may increase weight and frontal projected area, it is desirable to comprise various trade-offs in determining the angle of the flying object frame 120 and main body part, other than the loading part 11 and load 10, and other parts of the flying object.

In recent years, various forms of flying objects have been considered and implemented for use in industries other than home delivery (e.g., inspection, survey, photography, surveillance, agriculture, disaster prevention, etc.). By using the payload of the flying object for rescue supplies, information collection equipment, radio wave repeaters, etc., it is expected that urgently needed items can be delivered faster and further away, and that information can be collected quickly on accidents, disasters, and other urgent events.

The above mentioned embodiments are merely examples to facilitate understanding of the invention and are not intended to be construed as limiting the invention. It goes without saying that the invention may be changed and improved without departing from its purpose, and that the invention includes its equivalents.

DESCRIPTION OF REFERENCE NUMERALS

Description

10 Payload, load
11 Loading part
12 Non-slip
13 Lid member
20 Tray member
21 Film
100 Flying object
110*a*-110*d* Propellers
111*a*-111*d* Motors
120 Frame
130 Landing legs
131 Shock absorbing device

The invention claimed is:

1. A flying object capable of traveling in a front-rear direction, the flying object comprising:
   an airframe including a center position and a center point of lift generation,
   a loading part holding a delivery payload, wherein the loading part is attached to the airframe such that the loading part or the delivery payload is tilted backward in the front-rear direction in a landing state or a hovering state of the flying object,
   and in the landing or hovering state, a center position of the loading part is rearward of the center position of the airframe in the front-rear direction and above the center point of lift generation.

2. The flying object according to claim 1, wherein the loading part or the delivery payload is attached to the airframe such that the loading part or the delivery payload is substantially horizontal in a cruising state of the flying object.

3. The flying object according to claim 1, wherein, in the landing or hovering state, the center position of the loading part is located in front of the center position of the airframe in the front-rear direction and below the center point of lift generation.

4. The flying object according to claim 1, wherein, in the landing or hovering state, the center position of the loading part is rearward of the center position of the airframe in the front-rear direction and below the center point of lift generation.

5. The flying object according to claim 1, wherein, in the landing or hovering state, the center position of the loading part coincides with the center position of the airframe in the front-rear direction and below the center point of lift generation.

6. The flying object according to claim 1,
   wherein the loading part is configured to store the delivery payload from the front and above the airframe.

7. The flying object according to claim 6, wherein the loading part comprises a lid configured to be opened and closed to store the delivery payload.

8. The flying object according to claim 1,
   wherein the loading part is configured to store the delivery payload from behind and below the airframe.

9. The flying object according to claim 1,
   wherein the loading part is configured to store the delivery payload from the front of and below the airframe.

10. The flying object according to claim 1,
    wherein the loading part is configured to store the delivery payload from behind and above the airframe.

11. The flying object according to claim 1, wherein the flying object is provided with at least front and rear leg parts, and wherein the front leg part is longer than the rear leg part,
    The title of the invention has been amended as follows:
    Flying object with backward-tilting and forward-tilting delivery payload.

12. A flying object capable of traveling in a front-rear direction, the flying object comprising:
    an airframe including a center position and a center point of lift generation,
    a loading part holding a delivery payload, wherein the loading part is attached to the airframe such that the loading part or the delivery payload is tilted backward in the front-rear direction in a landing state or a hovering state of the flying object,
    and in the landing or hovering state, a center position of the loading part is in front of the center position of the airframe in the front-rear direction and above the center point of lift generation.

13. A flying object capable of traveling in a front-rear direction, the flying object comprising:
    an airframe including a center position and a center point of lift generation,
    a loading part holding a delivery payload, wherein the loading part is attached to the airframe such that the loading part or the delivery payload is tilted backward in the front-rear direction in a landing state or a hovering state of the flying object,
    and in the landing or hovering state, a center position of the loading part coincides with the center position of the airframe in the front-rear direction and is provided above the center point of the lift generation.

* * * * *